United States Patent
Izumi

(10) Patent No.: US 8,401,386 B2
(45) Date of Patent: Mar. 19, 2013

(54) OPTICAL TRANSMISSION APPARATUS

(75) Inventor: Futoshi Izumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 309 days.

(21) Appl. No.: 12/749,610

(22) Filed: Mar. 30, 2010

(65) Prior Publication Data

US 2010/0260499 A1 Oct. 14, 2010

(30) Foreign Application Priority Data

Apr. 9, 2009 (JP) ................................. 2009-094719

(51) Int. Cl.
*H04J 14/00* (2006.01)
*H04K 3/00* (2006.01)

(52) U.S. Cl. ............................... 398/48; 398/69; 398/33

(58) Field of Classification Search .................... 398/48, 398/69, 33
See application file for complete search history.

(56) References Cited

U.S. PATENT DOCUMENTS

| | | | |
|---|---|---|---|
| 2002/0041413 A1* | 4/2002 | Wang et al. | 359/128 |
| 2003/0002104 A1* | 1/2003 | Caroli et al. | 359/127 |
| 2005/0281558 A1* | 12/2005 | Wang et al. | 398/85 |
| 2007/0014513 A1* | 1/2007 | Isomura et al. | 385/24 |
| 2008/0267631 A1* | 10/2008 | Collings et al. | 398/97 |
| 2009/0041457 A1* | 2/2009 | Maki et al. | 398/45 |
| 2009/0110396 A1* | 4/2009 | Levner et al. | 398/49 |
| 2009/0129776 A1* | 5/2009 | Schimpe | 398/48 |
| 2009/0162067 A1* | 6/2009 | Kobayashi et al. | 398/79 |
| 2010/0034532 A1* | 2/2010 | Ghelfi et al. | 398/2 |
| 2010/0221004 A1* | 9/2010 | Haslam et al. | 398/49 |
| 2011/0176805 A1* | 7/2011 | Mahlab et al. | 398/48 |
| 2012/0128347 A1* | 5/2012 | Sakamoto et al. | 398/9 |

FOREIGN PATENT DOCUMENTS

| | | |
|---|---|---|
| JP | 2008-503921 | 2/2008 |
| WO | 2006/007304 | 1/2006 |
| WO | WO 2008031452 A1 * | 3/2008 |

* cited by examiner

*Primary Examiner* — Kenneth N Vanderpuye
*Assistant Examiner* — Amritbir Sandhu
(74) *Attorney, Agent, or Firm* — Staas & Halsey LLP

(57) ABSTRACT

There is provided an optical transmission apparatus including: a plurality of wavelength selective switches including input ports, a transmission port, and monitor port used to output a light switched so that the light from the input port is monitored; a multiplexer to combine the lights output from the transmission ports of the plurality of wavelength selective switches; a monitor to monitor whether a same wavelength of the light output from the monitor port exists in wavelengths of the lights combined by the multiplexer; and a controller to control the wavelength selective switch so as to output, from the transmission port, the light switched to the monitor port in case that the same wavelength of the light output from the monitor port is absent in wavelengths of the lights combined by the multiplexer, based on a monitor result by the monitor.

11 Claims, 20 Drawing Sheets

FIG. 12
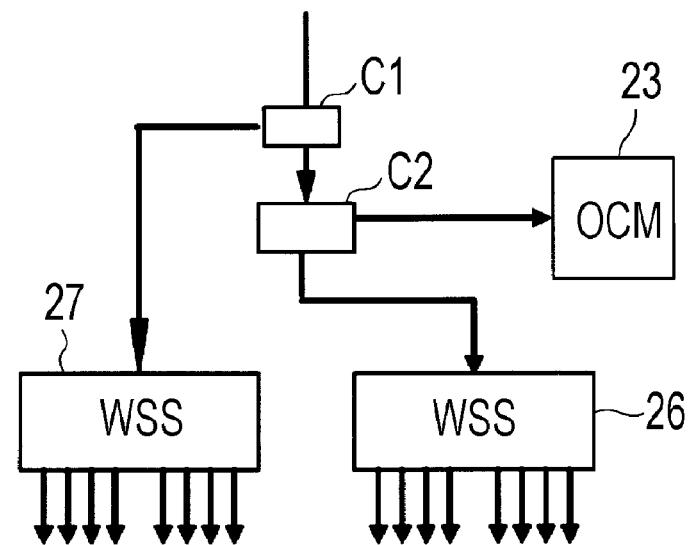
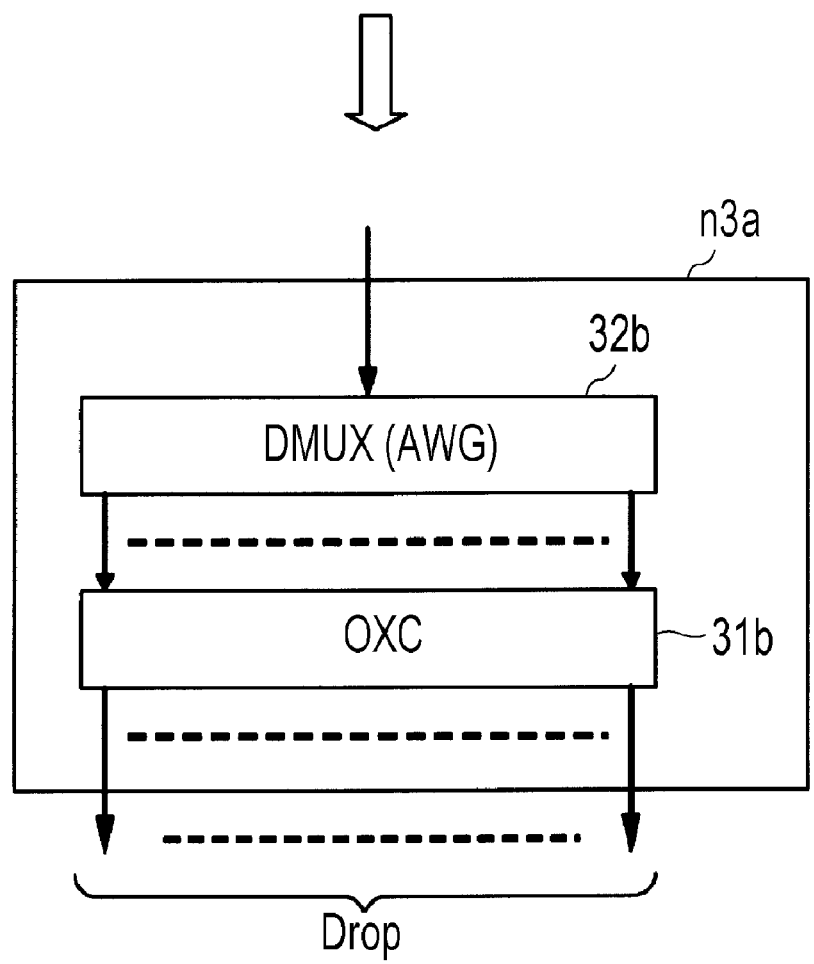

FIG. 18
Colored WDM
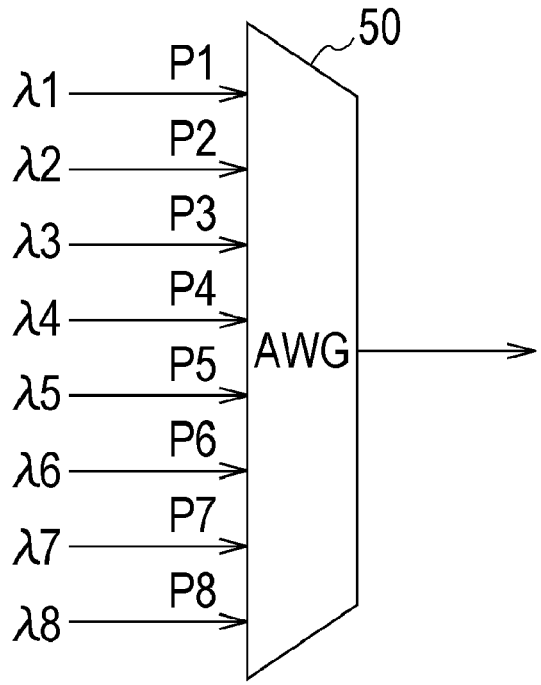
CHANGE OF INPUT WAVELENGTH
CONNECTION IS IMPOSSIBLE
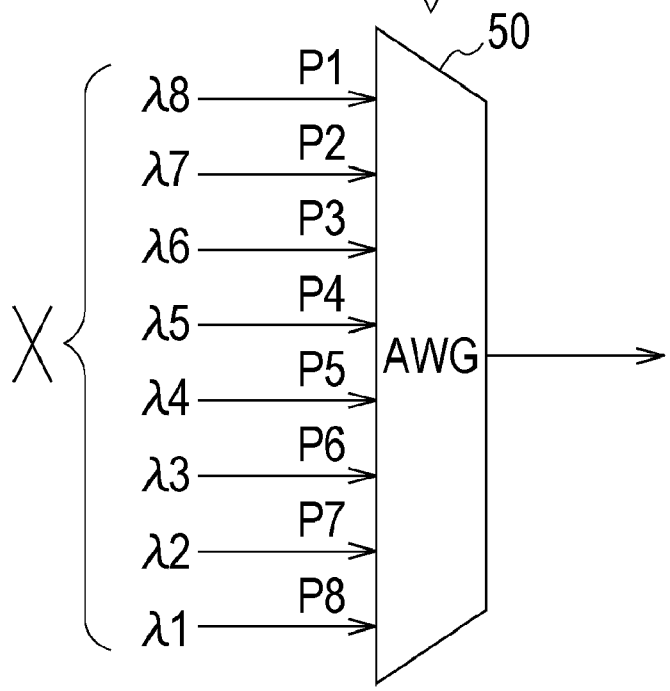

FIG. 21
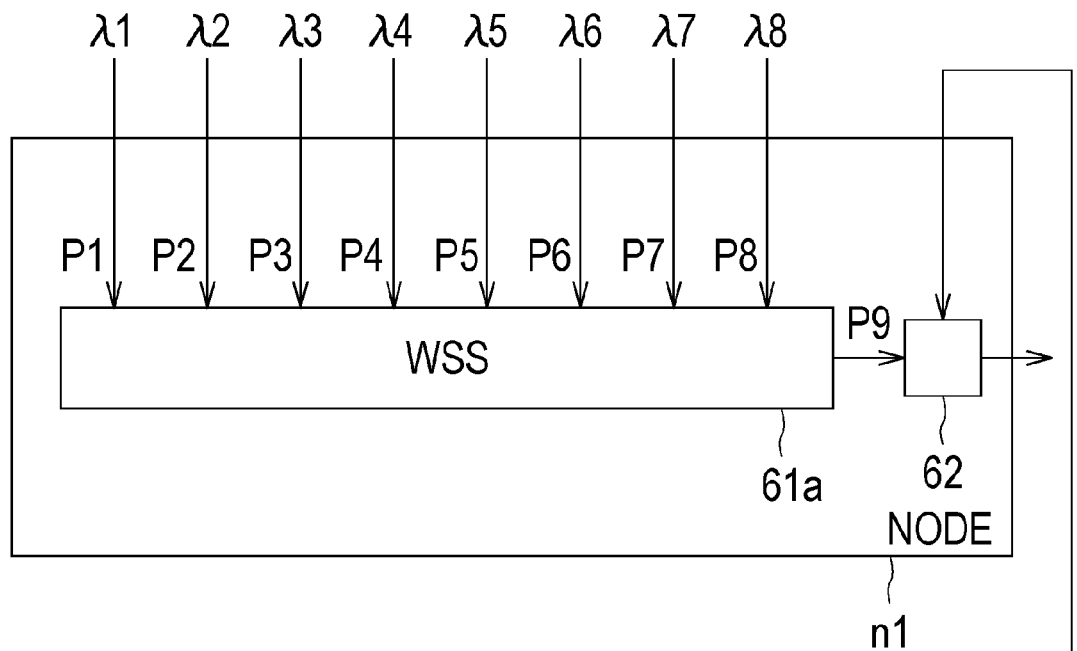
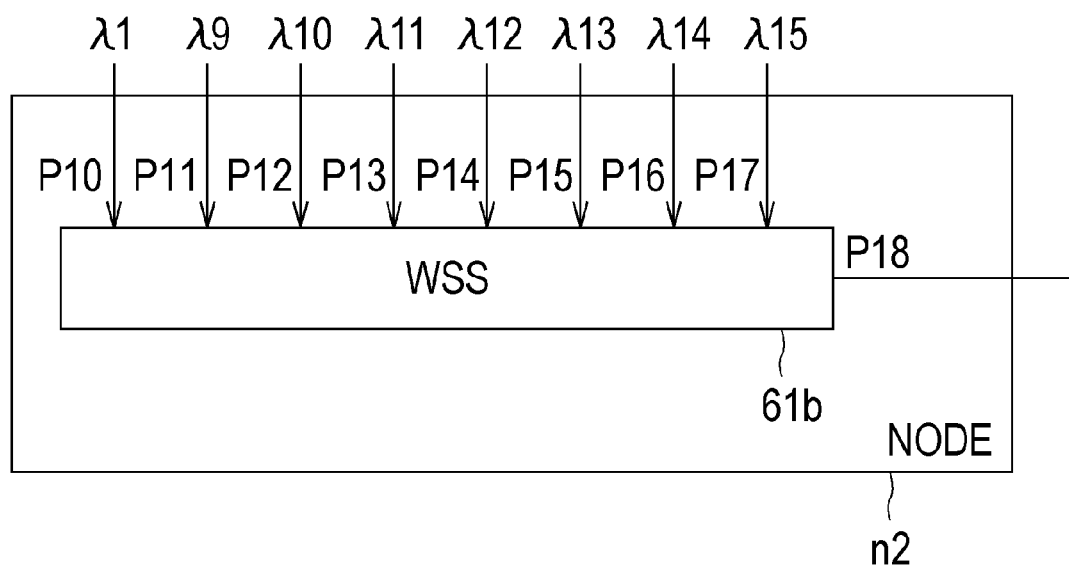

OPTICAL TRANSMISSION APPARATUS

CROSS-REFERENCE TO RELATED APPLICATION

This application is based upon and claims the benefit of priority of the prior Japanese Patent Application No. 2009-094719, filed on Apr. 9, 2009, the entire contents of which are incorporated herein by reference.

FIELD

The embodiments discussed herein are related to an optical transmission apparatus for performing optical transmission. For example, WDM (wavelength division multiplexing) transmission is included in the optical transmission.

BACKGROUND

In an existing optical communication system for performing WDM transmission, fixed wavelength allocation in which only a light of a specific wavelength is input into an input port and output from an output port has been performed. On the other hand, recently, a system allowing dynamic connection of wavelengths without fixing relation between input and output ports and wavelengths to be handled has been developed.

The fixed wavelength allocation is such that a light of, for example, a wavelength λ1 is connected to (input into) a port P1 with no exception. On the other hand, dynamic wavelength allocation is such that any of lights of, for example, wavelengths λ1 to λn may be freely connected to (input into) the port P1.

The former is called Colored WDM transmission because it depends on the wavelength to be handled and the latter is called Colorless WDM transmission because it does not depend on the wavelength to be handled. In existing WDM systems, the Colored WDM transmission is mainly adopted. However, it is expected that a demand for the Colorless WDM transmission which is high in operability will increase in the feature. Thus, a demand to increase the functionality of an optical switching technique is now increasing accordingly.

As related art, a technique for selecting a tunable wavelength-band of contiguous channels from input light using a variable-bandwidth tunable filter and dividing the wavelength-band of contiguous channels into individual dropped channels using a colorless demultiplexer is proposed as disclosed, for example, in Japanese National Publication of International Patent Application No. 2008-503921 (paragraph [0007], FIG. 1).

SUMMARY

According to an aspect of the embodiment, there is provided an optical transmission apparatus including: a plurality of wavelength selective switches including input ports, a transmission port used to output a wavelength multiplexed light that the light from the input port is switched and multiplexed, and monitor port used to output a light switched so that the light from the input port is monitored; a multiplexer to combine the lights output from the transmission ports of the plurality of wavelength selective switches; a monitor to monitor whether a same wavelength of the light output from the monitor port exists in wavelengths of the lights combined by the multiplexer; and a controller to control the wavelength selective switch so as to output, from the transmission port, the light switched to the monitor port in case that the same wavelength of the light output from the monitor port is absent in wavelengths of the lights combined by the multiplexer, based on a monitor result by the monitor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 is a diagram illustrating an example of another configuration for performing WDM transmission using an OXC;

FIG. 18 is a diagram illustrating an AWG (arrayed waveguide grating);

FIG. 21 is a diagram illustrating WSSs connected together at multiple stages.

DESCRIPTION OF EMBODIMENTS

In the Colorless WDM transmission, functions such as MUX (wavelength multiplexing) function and DEMUX (wavelength demultiplexing (dividing)) function are implemented by optical switching control and a WSS (wavelength selective switch) is widely used as a general device for this purpose.

It may become possible to input a light of an arbitrary wavelength into the device concerned through any port to execute wavelength multiplexing and demultiplexing by using the WSS for the MUX/DEMUX functions, instead of a passive component such as an AWG (arrayed waveguide grating).

Figure 19:
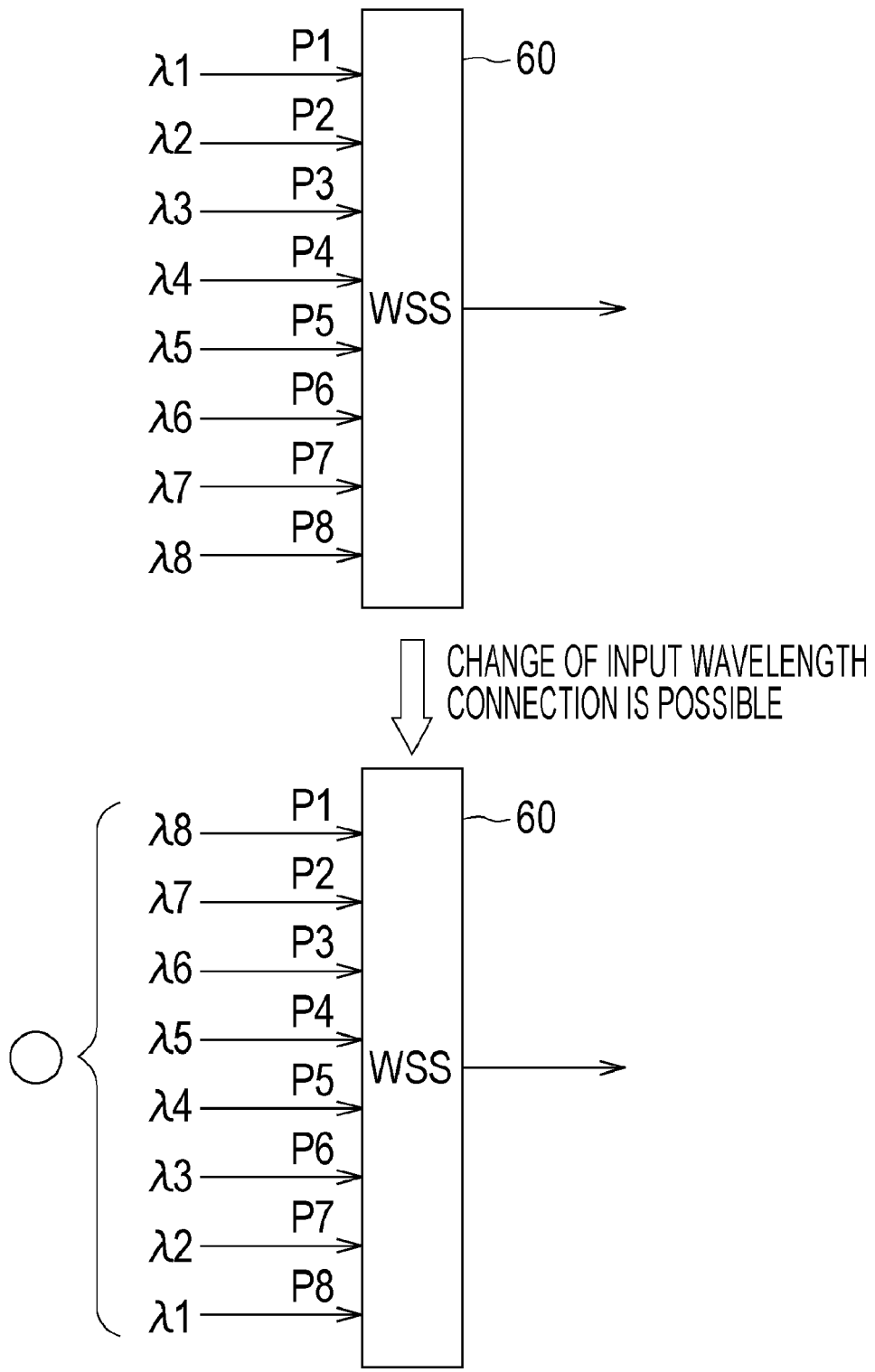
FIG. 19 is a diagram illustrating a WSS.

FIG. 18 is a diagram illustrating the AWG and FIG. 19 is a diagram illustrating the WSS, illustrating a difference in wavelength allocating function between the AWG and the WSS. It is supposed that both the AWG 50 and the WSS 60 have each 8×1 switching functions realized by eight input ports and one output port.

In the AWG 50 which is widely used in the Colored WDM transmission system, the wavelengths of lights input into the input ports of the AWG 50 are usually determined to have fixed values. If lights of the wavelengths $\lambda 1$ to $\lambda 8$ (the values of the wavelengths $\lambda 1$ to $\lambda 8$ are different from one another) are respectively allocated to the input ports P1 to P8 as inputs upon execution of the wavelength multiplexing operation using the AWG 50, this wavelength allocation will be made fixed. Therefore, for example, it may be impossible to allocate the lights of the wavelengths $\lambda 8$ to $\lambda 1$ to the respective input ports P1 to P8 in reverse input order.

On the other hand, in the WSS 60 of the Colorless WDM transmission system, allocation of lights of arbitrary wavelengths to the respective input ports is allowed. Therefore, it may be possible to allocate lights of the wavelengths $\lambda 1$ to $\lambda 8$ to the respective input ports P1 to P8 and it may b also possible to allocate lights of the wavelengths $\lambda 8$ to $\lambda 1$ to the respective input ports P1 to P8 in reverse input order.

As described above, in the WSS, lights of arbitrarily predetermined wavelengths may be input into the respective input ports. However, in a group of input ports of one WSS, it may be necessary to input lights of different wavelengths into the respective input ports.

Figure 20:
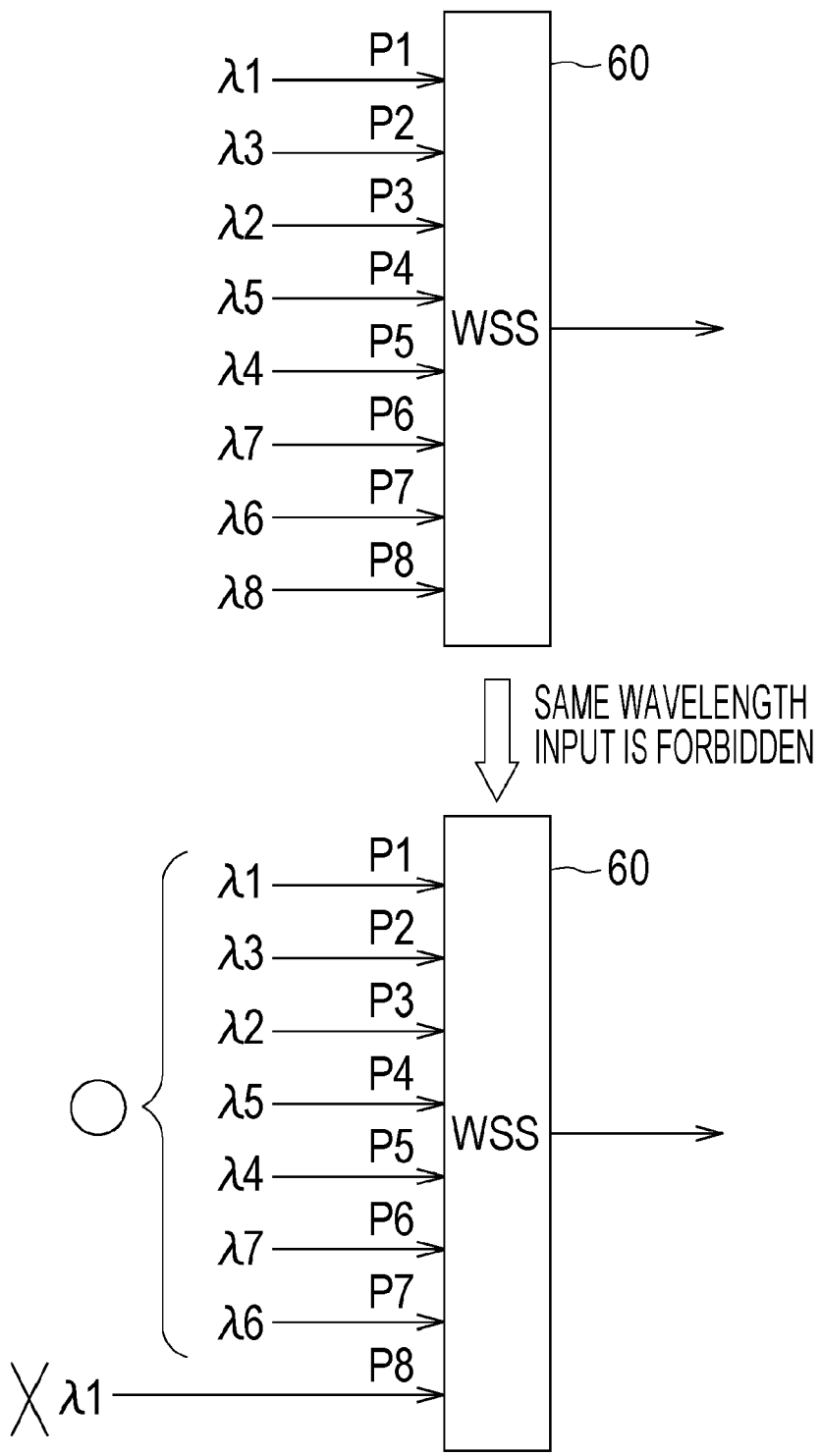
FIG. 20 is a diagram illustrating a manner of forbidding to input lights of the same wavelength into a group of input ports of a WSS.

FIG. 20 is a diagram illustrating an example in which inputting of lights of the same wavelength into a group of input ports of one WSS is forbidden. The WSS 60 has eight input ports P1 to P8, so that lights of the wavelengths $\lambda 1$ to $\lambda 8$ which are different from one another may be input into arbitrary input ports. However, it is not allowed to input the lights of the same wavelength (in the example, the wavelength $\lambda 1$) into the group of input ports of one WSS such that lights of the wavelengths $\lambda 1$ to $\lambda 7$ which are different from one another are arbitrarily into the input ports P1 to P7 and a light of the wavelength $\lambda 1$ is input into the input port P8.

As described above, a light of any wavelength may be input into the WSS through any input port of a group of input ports as long as lights of different wavelengths are input. However, for reasons of the configuration of the WSS, if lights of the same wavelength are input into the WSS, collision of lights will occur on the output side within the WSS to cause interference. Therefore, it may be impossible to input lights of the same wavelength into one WSS. Accordingly, in the Colorless WDM transmission system, it is important to construct the system so as not to input lights of the same wavelength into the group of inputs ports in each WSS.

However, such a problem may occur that even when each WSS is configured not to input the lights of the same wavelength into the group of input ports thereof, collision of lights of the same wavelength occurs at its output stage after light switching has been performed among a plurality of WSSs, for example, as WSSs are connected together at multiple stages and hence the system configuration becomes complicated.

FIG. 21 is a diagram illustrating WSSs connected together at multiple stages. A node n1 includes a WSS 61a constituted by eight input ports and one output port (hereinafter referred to as an 8×1 WSS) and a multiplexer 62. A node n2 includes an 8×1 WSS 61b. The WSS 61a selects one of lights of wavelengths input thereinto through input ports P1 to P8 and outputs the selected light from an output port P9. The WSS 61b selects one of lights of respective wavelengths input thereinto through input ports P10 to P17 and outputs the selected light from an output port P18. The multiplexer 62 wavelength-multiplexes the output light from the output port P9 and the output light from the output port P18 to be output to the outside.

Here, it is assumed that lights of the wavelengths $\lambda 1$ to $\lambda 8$ which are different from one another are input into the input ports P1 to P8 of the WSS 61a and lights of wavelengths $\lambda 1$ and $\lambda 9$ to $\lambda 15$ which are different from one another are input into the input ports P10 to P17 of the WSS 61b. In the above mentioned situation, lights of the wavelengths which are different from one another are input into the respective groups of input ports of the WSSs 61a and 61b, so that collision of one light with another light will not occur within each WSS. However, if the WSS 61a outputs the light of the wavelength $\lambda 1$ and the WSS 61b also outputs the light of the wavelength $\lambda 1$, collision of the lights of the same wavelength will occur in the multiplexer 62.

Even when a system is configured such that the lights of the same wavelength are not input into the group of input ports of each of the 8×1 WSSs 61a and 61bb in the above mentioned manner, in the case that it is expanded to have a WSS with 16×1 ports as described above, collision of the lights of the same wavelength may occur in a multiplexer for multiplexing outputs from the WSS 61a and 61b. Therefore, development of a system configured to perform high reliability and high quality WDM transmission realizing reduction of communication failures by usually monitoring for occurrence of collision of lights of the same wavelength while the system is being operated is asked for.

First Embodiment

Figure 1:
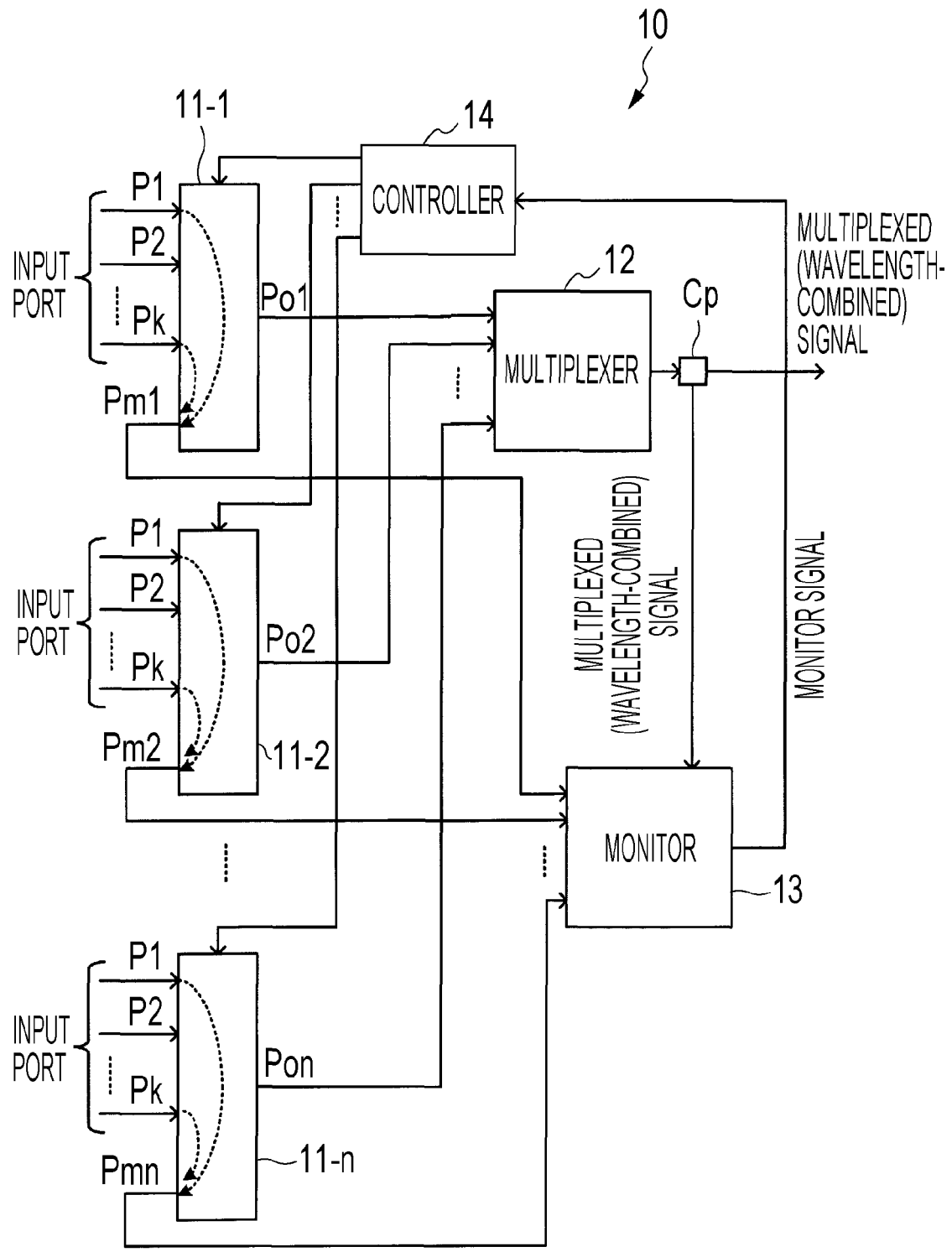
FIG. 1 is a diagram illustrating an example of a configuration of an optical transmission apparatus.

Next, embodiments will be described with reference to the accompanying drawings. FIG. 1 is a diagram illustrating an example of a configuration of an optical transmission apparatus. The optical transmission apparatus 10 includes wavelength selective switches (hereinafter, referred to as WSSs) 11-1 to 11-n, a multiplexer 12, a monitor 13, a controller 14 and a coupler Cp and is configured to perform WDM transmission using the above mentioned constitutional elements.

Each of the WSSs 11-1 to 11-n (generally referred to as a WSS 11) includes a plurality of input ports P1 to Pk, a transmission port (one port for one WSS, that is, transmission ports Po1 to Pon for the WSSs 11-1 to 11-n) for outputting a light obtained after switching and a monitor port (one port for one WSS, that is, monitor ports Pm1 to Pmn for the WSSs 11-1 to 11-n) for outputting lights of wavelengths input through the input ports P1 to Pk.

The multiplexer 12 wavelength-combines (multiplexes) lights output from the transmission ports Po1 to Pon of the respective WSSs 11-1 to 11-n and generates and outputs a wavelength-combined signal (wavelength-multiplexed signal (WDM signal)). The coupler Cp divides the wavelength-combined signal output from the multiplexer 12 into two branch signals and transmits one branch signal to a succeeding stage processing section (such as an optical post-amplifier not illustrated) and another branch signal to the monitor 13.

The monitor 13 monitors lights output from the monitor ports Pm1 to Pmn and the wavelength-combined branch signal and notifies the controller 14 of a result of monitoring using a monitor signal.

The controller 14 controls switching of the WSSs 11-1 to 11-*n* on the basis of the result of monitoring. Incidentally, the controller 14 also controls operations of constitutional elements other than the WSSs 11-1 to 11-*n* and generally controls the operation of the apparatus. In addition, the controller has a user interface function and hence may permit to perform data setting from the outside using the user interface function.

In the example illustrated in the drawing, when a wavelength has been added, each of the WSSs 11-1 to 11-*n* connects one input port into which a light of a wavelength which has been added (hereinafter, referred to as an added wavelength) to the monitor port to output the light of the input wavelength (the added wavelength) from the monitor port on the basis of a switch command given from the controller 14.

The monitor 13 monitors for presence of a light of the same wavelength as the added wavelength in signal lights which are wavelength-multiplexed with the wavelength-combined signal. In the case that it has been recognized that the light of the same wavelength as the added wavelength is not present from the result of monitoring and hence collision of lights of the same wavelength will not occur, the controller 14 controls switching of the WSS 11 so as to output the light of the added wavelength from the transmission port.

By way of example, a case in which a light of a wavelength λ1 is input into the WSS 11-1 through the input port P1 and is added will be considered. The WSS 11-1 internally connects the input port P1 through which the light of the added wavelength λ1 is input to the monitor port Pm1 and outputs the light of the added wavelength λ1 from the monitor port Pm1 on the basis of a switch command from the controller 14. The light of the wavelength λ1 is then transmitted to the monitor 13.

The monitor 13 monitors for presence of a light of the same wavelength as the added wavelength λ1 in the signal lights which are wavelength-multiplexed with the wavelength-combined signal. In the case that it has been recognized that the light of the same wavelength as the added wavelength λ1 is not present and hence collision of lights of the same wavelength will not occur from a result of monitoring, the controller 14 controls switching of the WSS 11-1 so as to output the light of the wavelength λ1 from the transmission port Po1.

The multiplexer 12 will then generate and output a wavelength-combined signal obtained by newly multiplexing the light of the wavelength λ1 with the current wavelength-combined signal (the control executed when a light of the same wavelength as the added wavelength λ1 is present will be described later).

Each of the WSS 11-1 to 11-*n* is configured as a k×2 WSS constituted by k input ports and two output ports (one transmission port and one monitor port). That is, one of N input ports originally prepared for an N×1 WSS (N=k+1) is used as an output port for monitor (a monitor port) to constitute an (N−1)×2 WSS. Downsizing of the apparatus may be realized by constituting a WDM function by using the WSS in which one of a plurality of input ports is used as the output port for monitor in the above mentioned manner.

In the optical transmission apparatus 10, the WSS 11 connects the input port into which the light of the added wavelength is input to the monitor port to output the light of the added wavelength from the monitor port. The monitor 13 monitors for presence of a light of the same wavelength as the added wavelength in lights of a plurality of wavelengths which are multiplexed with the wavelength-combined signal. In the case that it has been recognized that the light of the same wavelength as the added wavelength is not present, the controller 14 controls switching of the WSS concerned so as to output the light of the added wavelength from the transmission port.

The apparatus is configured such that after monitoring for possibility of occurrence of collision of lights of the same wavelength has been performed, only the light of the added wavelength which has been determined not to cause collision with the light of the same wavelength is wavelength-combined with other lights as described above, so that communication failures which would occur owing to the wavelength collision of the lights of the same wavelength may be prevented from generating even at a portion where the outputs from the plurality of WSSs are wavelength-combined with one another and hence high reliability and high quality WDM transmission may be performed.

Figure 2:
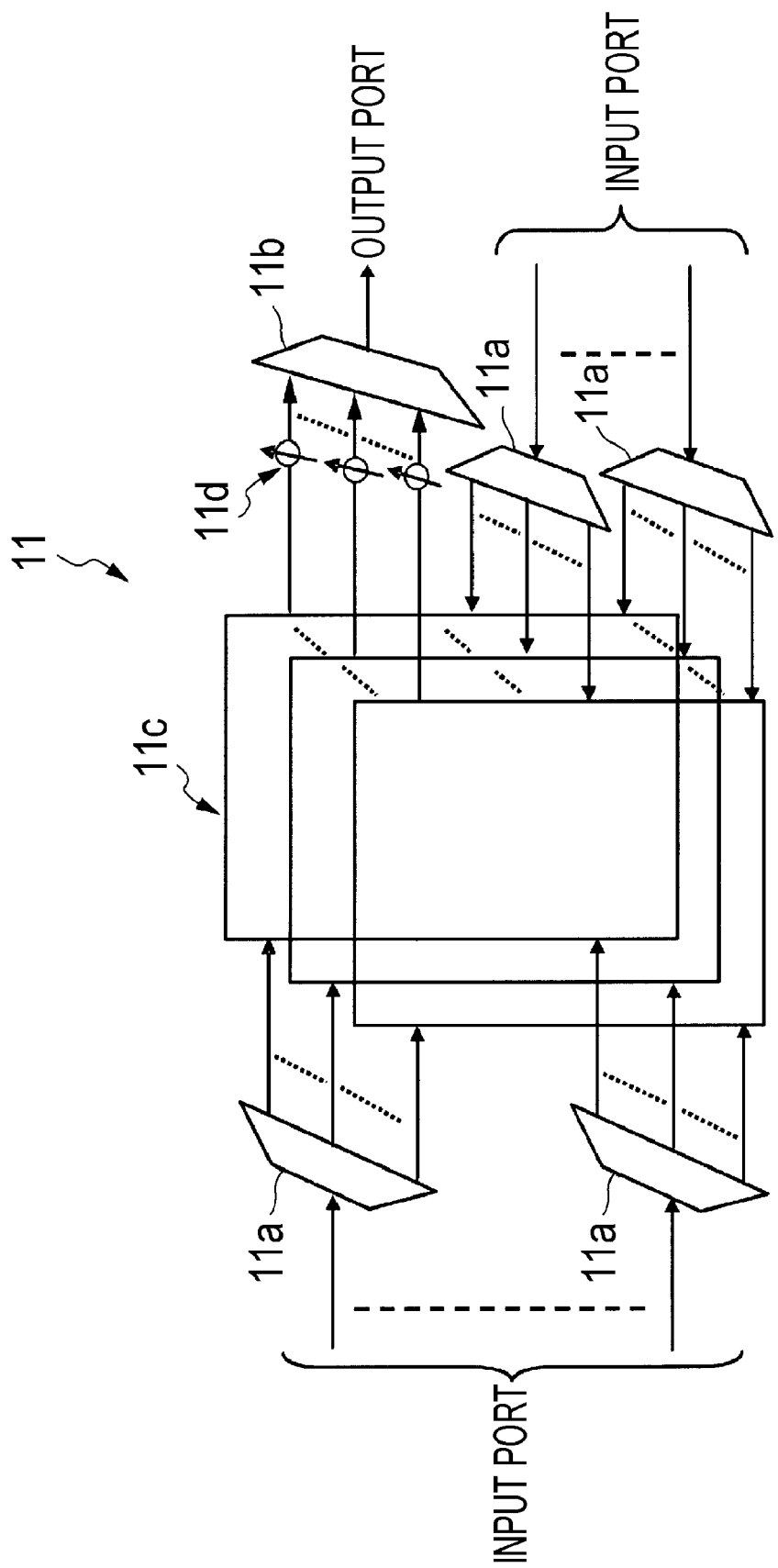
FIG. 2 is a diagram illustrating an example of a configuration of a WSS (wavelength selective switch)

Next, a configuration of the WSS 11 will be described. FIG. 2 is a diagram illustrating an example of a configuration of the WSS 11. That is, FIG. 2 generally illustrates the configuration of the WWS 11. The WSS 11 includes a wavelength dividing (demultiplexing) section 11*a*, a wavelength multiplexing section 11*b*, a mesh switch 11*c* and a VOA (variable optical attenuator) 11*d*.

The wavelength demultiplexing section 11*a* and the wavelength multiplexing section 11*b* are constituted by AWGs. The wavelength demultiplexing section 11*a* is disposed at each input port and the wavelength multiplexing section 11*b* is disposed at the output port. The wavelength demultiplexing section 11*a* outputs a light input from the input port concerned from an output end of a predetermined wavelength. Thus, in the case that the wavelength-multiplexed WDM signal has been input into the WSS through the input port concerned, the signal will be demultiplexed (divided) to signal lights, each having a single wavelength and the demultiplexed signal lights are output from their corresponding wavelength output ends. The wavelength multiplexing section 11*b* receives the lights which have been switched using the mesh switch 11*c* and subjected to level adjustment using the VOA 11*d*, and wavelength-multiplexes the lights to be output.

The mesh switch 11*c* is an MEMS (micro electro mechanical systems) type mirror array and performs light switching by varying the angle of each mirror on the basis of a switch command from the controller 14. The mesh switch 11*c* is installed for each wavelength. For example, for switching lights of 44 wavelengths which are different from one another, 44 mesh switches 11*c* will be installed.

The VOA 11*d* attenuates and adjusts the level of the signal light which has been subjected to switching using the mesh switch 11*c*. Incidentally, in reality, the light level is adjusted by changing the beam irradiation angle using the mesh mirror 11*c*. The VOA 11*d* is illustrated in the drawing just as a circuit representing this level adjusting function (thus, it is not the case that the VOA is installed as an actual circuit in the WSS 11).

Figure 3:
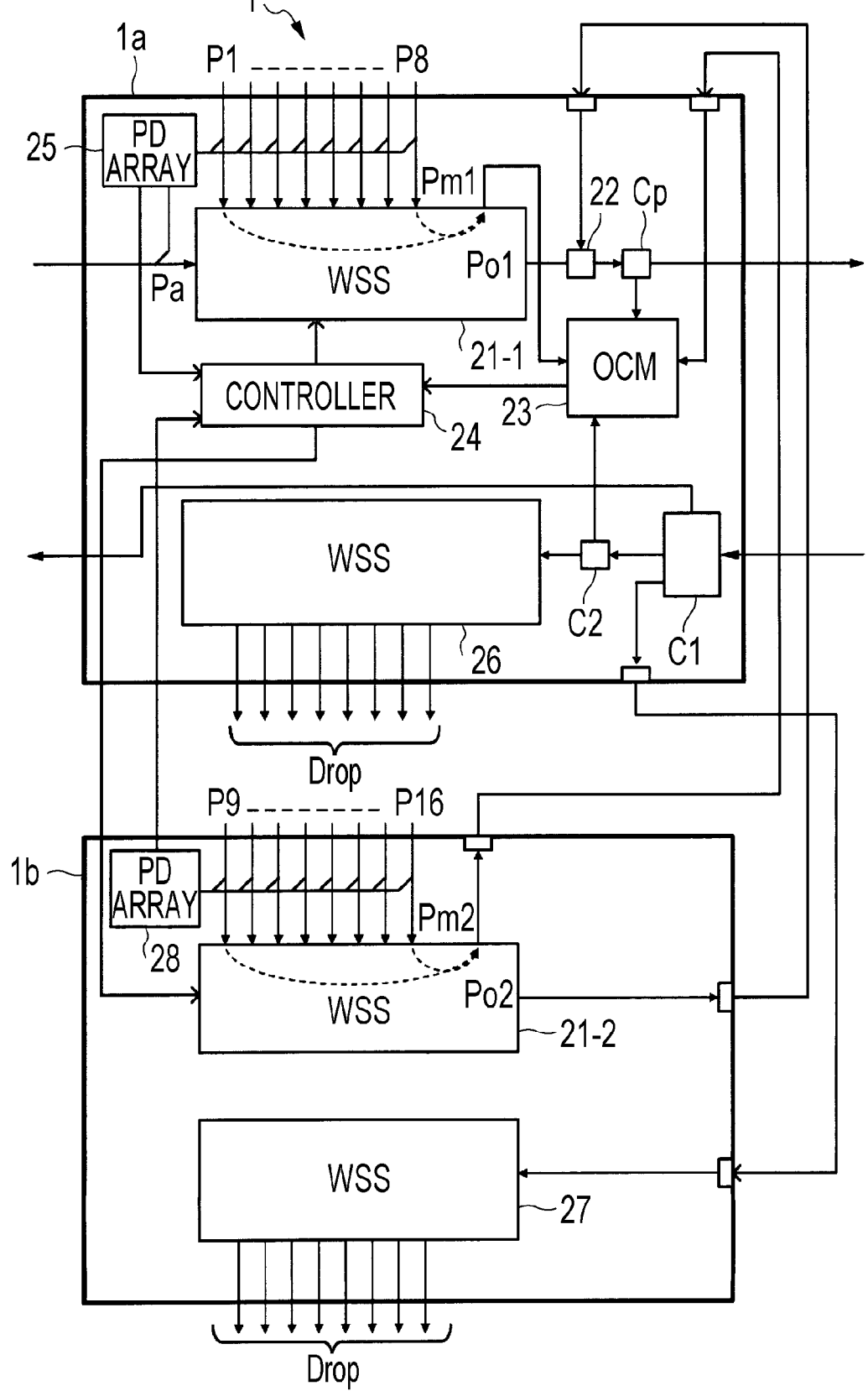
FIG. 3 is a diagram illustrating an example of a configuration of one WDM system.

Next, a configuration and operations in the case that the function of the optical transmission apparatus 10 has been applied to a WDM system will be described in detail. FIG. 3 is a diagram illustrating an example of a configuration of the WDM system. The WDM system 1 includes a master node 1*a* and a slave node 1*b*.

The master node 1*a* includes a WSS 21-1, a multiplexer 22, an OCM (optical channel monitor) 23, a controller 24, a PD (photo diode) array 25, a WSS 26 and couplers Cp, C1 and C2. The slave node 1*b* includes a WSS 21-2, a WSS 27 and a PD array 28.

The WSS 21-1 includes the input ports P1 to P8 and Pa, the monitor port Pm1 and the transmission port Po1. The input ports P1 to P8 are ports used for wavelength addition (for Add) and the input port Pa is a port through which a WDM signal which has been flown from the upstream is input into the WSS. The WSS 21-2 includes the input ports P9 to P16, the monitor port Pm1 and the transmission port Po2. The input ports P9 to P16 are ports used for wavelength addition.

The multiplexer 22 wavelength-combines a light which has been output from the transmission port Po1 of the WSS 21-1 with a light which has been output from the transmission port Po2 of the WSS 21-2 to generate a wavelength-combined signal. The coupler Cp divides the wavelength-combined signal which has been output from the multiplexer 22 into two branch signals and transmits one branch signal to a succeeding stage processing section (such as an optical post-amplifier not illustrated) and another branch signal to the OCM 23.

A WDM signal (amplified using an optical pre-amplifier not illustrated) transmitted from the downstream is divided into three branch signal lights. The first branch signal light is transmitted toward the upstream, the second branch signal light is transmitted to the coupler C2 and the third branch signal light is transmitted to the WSS 27 of the slave node 1b.

The coupler C2 divides the received signal light into two branch signal lights and transmits one branch signal light to the OCM 23 and another branch signal light to the WSS 26. The WSS 26 wavelength-demultiplexes the WDM signal transmitted from the coupler C2 and drops lights of the respective wavelengths out of predetermined output ports. The WSS 27 wavelength-demultiplexes the WDM signal transmitted from the coupler C1 and drops lights of the respective wavelengths out of predetermined output ports. Incidentally, tunable filter arrays, each being configured to transmit a light by variably selecting a wavelength, may be used in the WDMs 26 and 27.

The OCM 23 receives lights of respective wavelengths which have been output from the monitor port Pm1 of the WSS 21-1 and the monitor port Pm1 of the WSS 21-2 and the wavelength-combined signal which has been wavelength-combined using the multiplexer 22 and then is branched using the coupler Cp.

The OCM 23 then monitors for presence of a light of the same amplitude as that of the light which has been output from the monitor port Pm1 of the WSS 21-1 or that of the light which has been output from the monitor port Pm2 of the WSS 21-2 in each signal light of a plurality of wavelengths multiplexed with the wavelength-combined signal and notifies the controller 24 of a result of monitoring.

In addition, the OCM 23 also receives the WDM signal which has been branched using the coupler C2 and flown from the downstream to monitor as to whether a light of each wavelength multiplexed with the WDM signal is at a normal level.

The PD array 25 is connected to the respective input ports P1 to P8 and Pa, and in the case that a light has been input into any one of the input ports P1 to P8 and Pa, receives the input light, converts the light into an electric signal and transmits a detection signal indicative of reception of the light to the controller 24. The controller 24 recognizes the input port to which the light has been input by receiving the detection signal.

Likewise, the PD array 28 is connected to the respective input ports P9 to P16, and in the case that a light has been input into any one of the input ports P9 to P16, receives the input light, converts the light into an electric signal and transmits a detection signal indicative of reception of the light to the controller 24.

Figure 4:
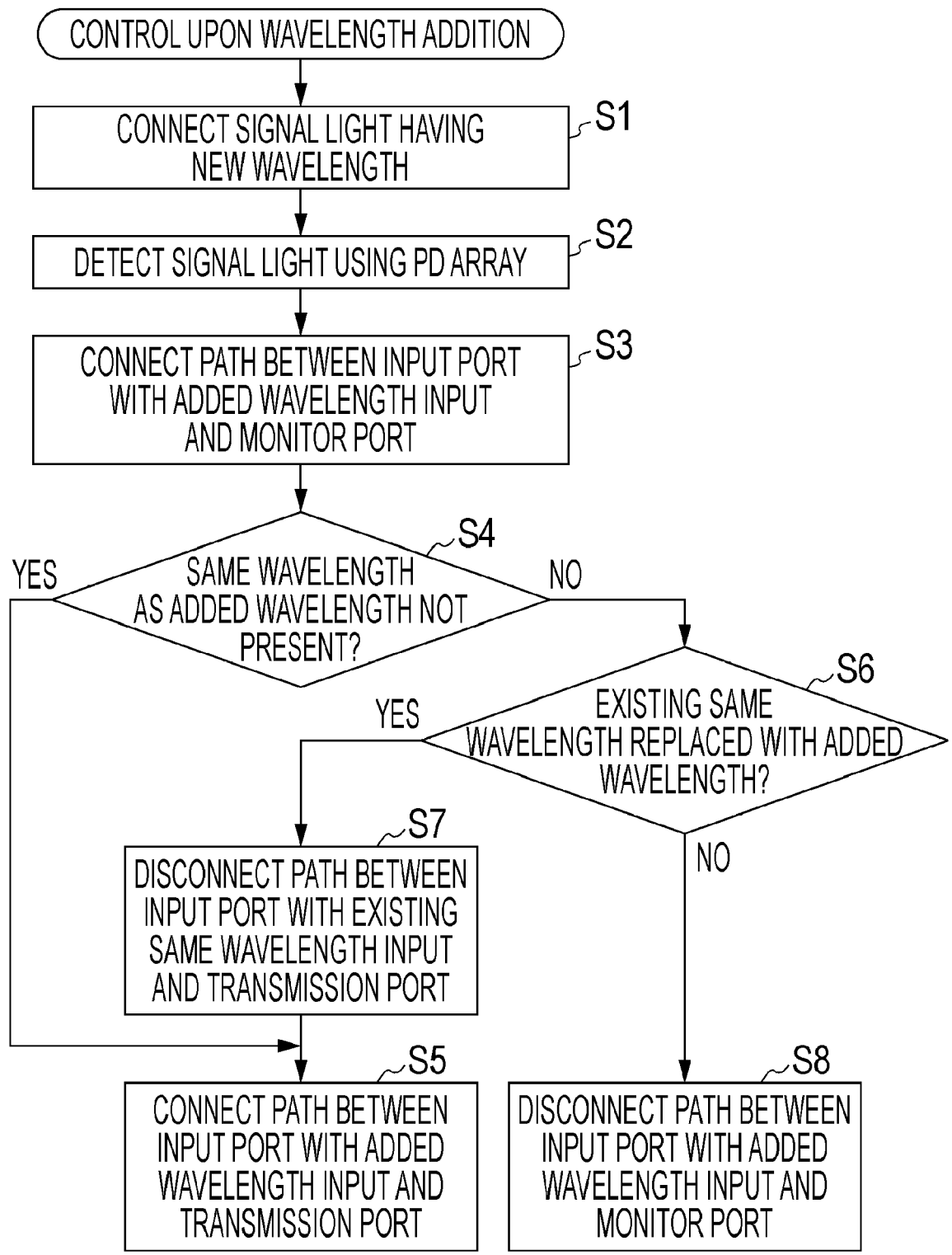
FIG. 4 is a flowchart illustrating operations executed when a wavelength has been added.

Next, the operations of the WDM system 1 executed when a wavelength has been added will be described by using a flowchart concerned. FIG. 4 is a flowchart illustrating the operations executed when a wavelength has been added.

step S1: A signal light of a new wavelength is input into the input port P1 for wavelength addition (by way of example, it is assumed that wavelength addition has been performed at the input port P1).

step S2: The PD array 25 detects the signal light which has been input into the input port P1 and transmits a detection signal to the controller 24.

step S3: The controller 24 recognizes that wavelength addition has been performed and gives the WSS 21-1 a switch command to connect the input port P1 of the WSS 21-1 to the monitor port Pm1. The WSS 21-1 performs a switching process on the basis of the switch command.

In the above mentioned situation, it is assumed that the WDM system performs WDM transmission allowing multiplexing of wavelengths of the number up to 44 consisting of wavelengths $\lambda 1$ to $\lambda 44$. In the above mentioned case, the wavelength of the signal light which will be input into the WSS concerned through the input port P1 will be any one of the wavelengths $\lambda 1$ to $\lambda 44$.

Thus, that the input port P1 of the WSS 21-1 is connected to the monitor port Pm1 specifically means that switching is performed so as to direct the light of the input wavelength toward the monitor port Pm1 irrespective of inputting of a light of any of wavelengths $\lambda 1$ to $\lambda 44$ through the input port P1. Thus, the mesh switches 11c (indicated in FIG. 2) of the number corresponding to all the wavelengths in the WSS 21-1 will be equally switched to the monitor port Pm1.

step S4: The OCM 23 monitors the light output from the monitor port Pm1 of the WSS 21-1, the light output from the monitor port Pm1 of the WSS 21-2 and the wavelength-combined signal which has been branched using the coupler Cp. That is, the OCM 23 determines whether there exists a light of the same wavelength as the wavelengths (the added wavelengths) of the lights input through the input ports P1 to P8 and the input ports P9 to P16 in the wavelength-combined signal which is being currently in service. In the example illustrated in the drawing, whether the light of the same wavelength as that of the light input through the input port P1 is multiplexed to the wavelength-combined signal, that is, a light of the same wavelength as the added wavelength is not present will be determined. In the case that it has been determined that the light of the same wavelength as the added wavelength is not present, the process proceeds to step S5. While, in the case that it has been determined that the light of the same wavelength as the added wavelength is present, the process proceeds to step S6.

step S5: The controller 24 gives the WSS 21-1 a switch command to output the light of the wavelength input into the input port P1 of the WSS 21-1 from the transmission port Po1. The WSS 21-1 connects a path which is established between the input port P1 and the transmission port Po1 and along which the light of the added wavelength travels from the input port P1 toward the transmission port Po1 on the basis of the switch command.

The controller also controls switching while performing level adjustment by stepwise decreasing the attenuation amount (gradually increasing the light level) so as to output the light of the added wavelength from the transmission port Po1 at a desired level simultaneously with the above mentioned operation. Further, paths of the lights of the wavelengths other than that of the added wavelength at the input port P1 are still being connected to the monitor port Pm1 and hence connection of all the above mentioned paths is cut off.

step S6: Whether a light of the existing same wavelength as the added wavelength is to be replaced with the light of the added wavelength is determined. This means that in the case that the light of the same wavelength as the added wavelength is present in the lights of wavelengths multiplexed with the wavelength-combined signal, the light of the same wavelength which is multiplexed with the wavelength-combined signal is to be replaced with the light of the added wavelength (for example, in the case that it is desired to transmit data which is different from the data which is being currently transmitted by using the light of the same wavelength). When wavelength replacement is to be performed, the process proceeds to step S7. While, when wavelength replacement is not performed, the process proceeds to step S8.

Step S7: The controller 24 gives the WSS concerned a switch command to disconnect the light of the existing same wavelength as the added wavelength. Incidentally, the controller 24 recognizes that lights of all the wavelengths which are multiplexed with the wavelength-combined signal are input through which input port of which WSS. Here, for example, assuming that the light of the same wavelength as the added wavelength has been input into the input port P9 of the WSS 21-2, the WSS 21-2 will disconnect a path which is established between the input port P9 and the transmission port Po2 and along which the light of the existing same wavelength as the added wavelength travels from the input port P9 toward the transmission port Po2.

Incidentally, in the above mentioned case, the path is not disconnected instantly and disconnection is performed while adjusting the light level by stepwise increasing the attenuation amount (gradually decreasing the light level) of the light of the existing same wavelength as the added wavelength. The process then proceeds to step S5.

step S8: The controller 24 gives the WSS 21-1 a switch command to disconnect the path of the light of the wavelength which has been input into the input port P1 of the WSS 21-1. The WSS 21-1 disconnects the paths which are established between the input port P1 and the monitor port Pm1 and along which the lights of all the wavelengths travel from the input port P1 toward the monitor port Pm1.

Figure 5:
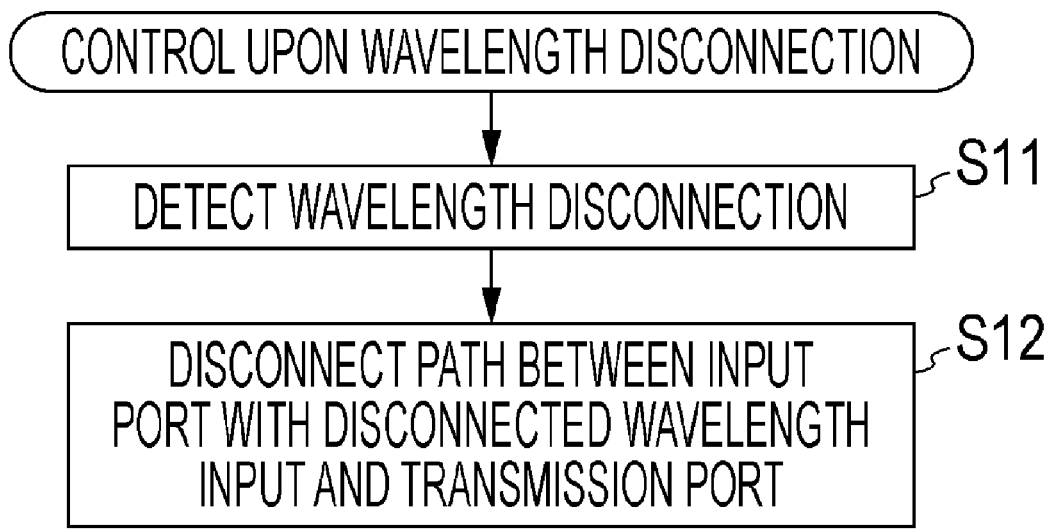
FIG. 5 is a flowchart illustrating operations executed when a wavelength has been disconnected.

Next, the operations of the WDM system 1 executed when a wavelength has been disconnected will be described. FIG. 5 is a flowchart illustrating the operations executed when a wavelength has been disconnected. Incidentally, wavelength disconnection is a phenomenon that a light of a wavelength in multiplexed wavelengths of a wavelength-combined signal is lost for reasons of occurrence of some failure and which would occur with no intention of a user or a maintenance man.

step S11: The OCM 23 detects disconnection of a light of a wavelength in the lights of multiplexed wavelengths of the wavelength-combined signal and notifies the controller 24 of detection of wavelength disconnection.

step S12: The controller 24 gives the WSS concerned a switch command to cut off connection between an input port into which a light of wavelength which has been disconnected (hereinafter, referred to as a light of a disconnected wavelength) has been input and the transmission port. For example, assuming that the wavelength of the light input into the WSS 21-1 through the input port P2 has been disconnected, the WSS 21-1 will disconnect paths of lights of all the wavelengths between the input port P2 and the transmission port Po1.

In the case that wavelength disconnection has been detected, a failure may occur in a path between an input port into which the light of the disconnected wavelength has been input and the transmission port. Therefore, it may become possible to avoid occurrence of additional failures by disconnecting the paths of lights of all the wavelengths established between the input port into which the light of the disconnected wavelength has been input and the transmission ports in the WSS, instead of disconnection of only the path of the light of the disconnected wavelength.

Figure 6:
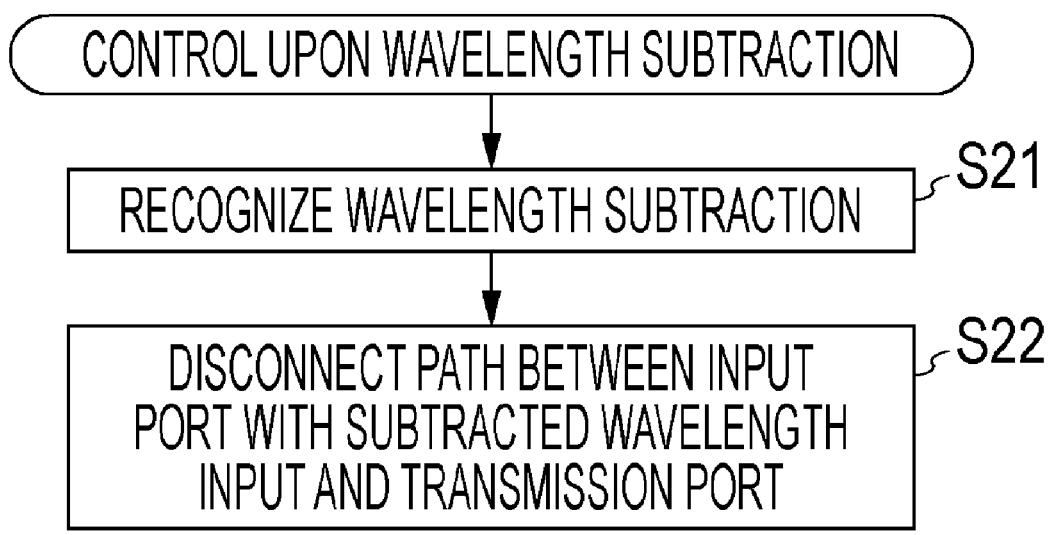
FIG. 6 is a flowchart illustrating operations executed when a wavelength has been subtracted.

Next, the operations of the WDM system 1 executed when a wavelength has been subtracted. FIG. 6 is a flowchart illustrating the operations executed when a wavelength has been subtracted. Incidentally, wavelength subtraction means to remove, for example, the light of a wavelength which is not used in lights which are currently multiplexed with the wavelength-combined signal under the operation of a user or a maintenance man.

step S21: The controller 24 recognizes that subtraction has been set for a certain wavelength of a light in lights of the multiplexed wavelengths of the wavelength-combined signal.

step S22: The controller 24 gives the WSS concerned a switch command to cut off connection between an input port into which the light of the wavelength for which subtraction has been set has been input and the transmission port. For example, assuming that the wavelength of the light input through the input port P2 of the WSS 21-1 is to be subtracted, the WSS 21-1 will disconnect a path which is established between the input port P2 and the transmission port Po1 and along which the light of the subtracted wavelength travels from the input port P2 toward the transmission port Po1. In the above mentioned case, disconnection is performed while adjusting the light level by stepwise increasing the attenuation amount of the light of the subtracted wavelength.

In the above mentioned situation, in the case that a light is output from the transmission port or output of the light is stopped in the WSS, switching is performed while adjusting the level so as not to cause a malfunction of an optical amplifier (for example, an optical post-amplifier installed at the succeeding stage of the multiplexer 22) in a node concerned.

That is, in the WSS, in the case that a path from an input port to the transmission port is to be connected, the path is connected while stepwise decreasing the attenuation amount of the light concerned (gradually increasing the light level). On the other hand, in the case that a path from an input port to the transmission port is to be disconnected, the path is disconnected while stepwise increasing the attenuation amount of the light concerned (gradually decreasing the light level). As a result of execution of switching control of the WSS while executing the level adjustment as mentioned above, it may become possible to make the optical amplifier used in the WDM system execute amplification with the normal responding characteristics, thereby reducing malfunctions of the optical amplifier.

Second Embodiment

Next, a WDM system with no use of a PD array will be described. In the above mentioned embodiment, an input port at which wavelength addition has been performed is detected using the PD array. On the other hand, in this embodiment, monitoring is performed at a constant cycle to see whether a light of an added wavelength has been input into an input port.

Figure 7:
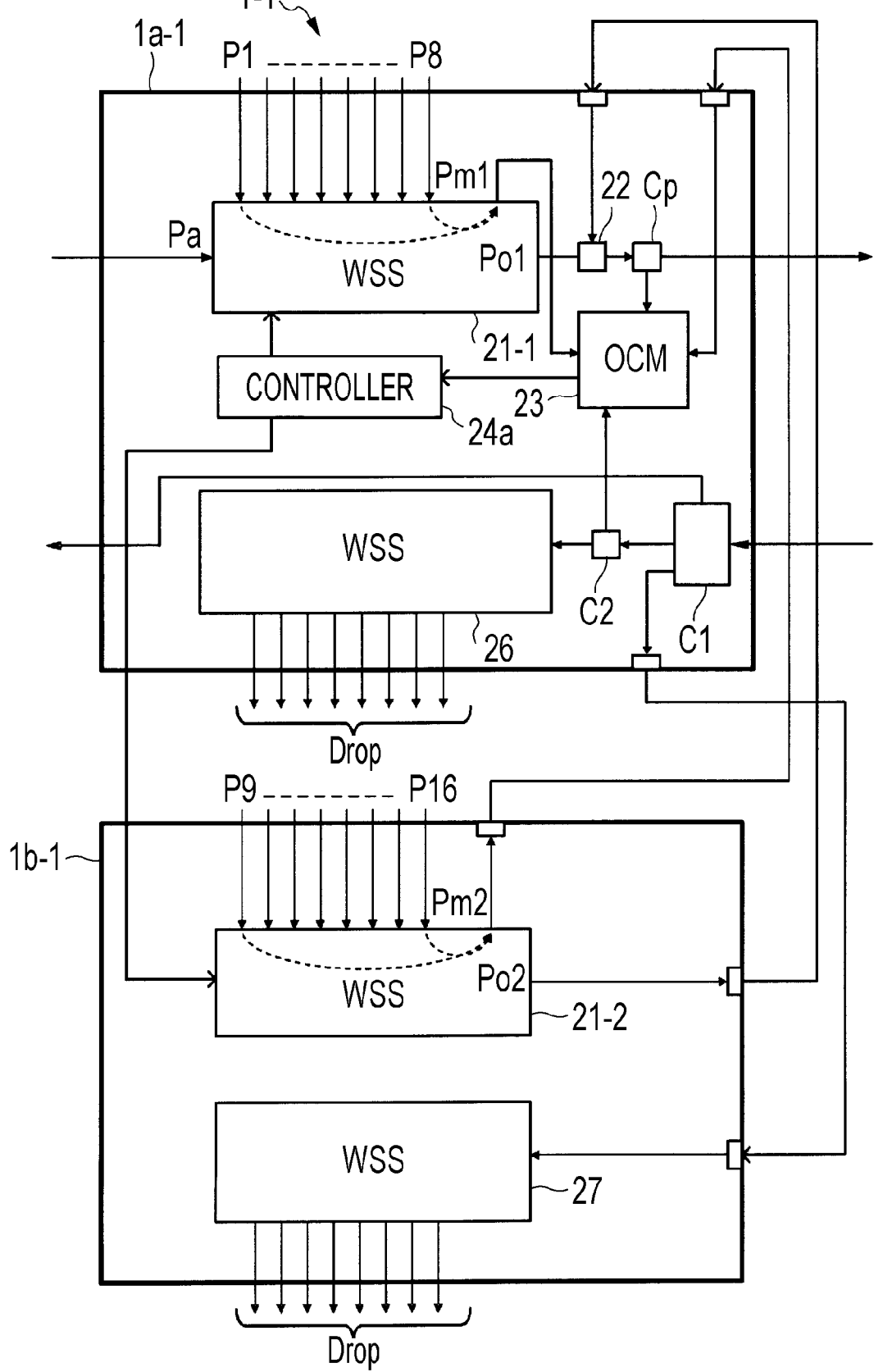
FIG. 7 is a diagram illustrating an example of a configuration of another WDM system.

FIG. 7 is a diagram illustrating an example of a configuration of a WDM system. A WDM system 1-1 includes a master node 1a-1 and a slave node 1b-1. The master node 1a-1 includes the WSS 21-1, the multiplexer 22, the OCM 23, a controller 24a, the WSS 26 and the coupler Cp, C1 and C2. The slave node 1b-1 includes the WSS 21-2 and the WSS 27.

The controller 24a gives the WSS concerned a switch command to sequentially connect not yet wavelength added input ports, that is, input ports at which wavelength addition is not yet performed other than an input port at which wavelength addition has already been performed in the input ports P1 to P8 and P9 to P16 and the monitor port at a constant cycle so as to output lights of all wavelengths which are input into the not yet wavelength added input ports from the monitor port.

For example, it is assumed that in the WSS 21-1, lights of predetermined wavelengths have already been input into the input ports P1 to P5 and the input ports P6 to P8 are input ports at which wavelength addition is not performed. In the above mentioned situation, a connecting process will be performed at a constant cycle in order of connection between the input port P6 and the monitor port Pm1→connection between the input port P7 and the monitor port Pm1→connection between the input port P8 and the monitor port Pm1→connection between the input port P6 and the monitor Pm1→and so on so as to monitor signal lights output from the monitor port Pm1 using the OCM 23.

Wavelength addition at the input port concerned of the WSS may be detected without using the PD array which has been described with reference to FIG. 3 by performing wavelength detection control as described above, thereby downsizing of the apparatus may be realized.

Figure 8:
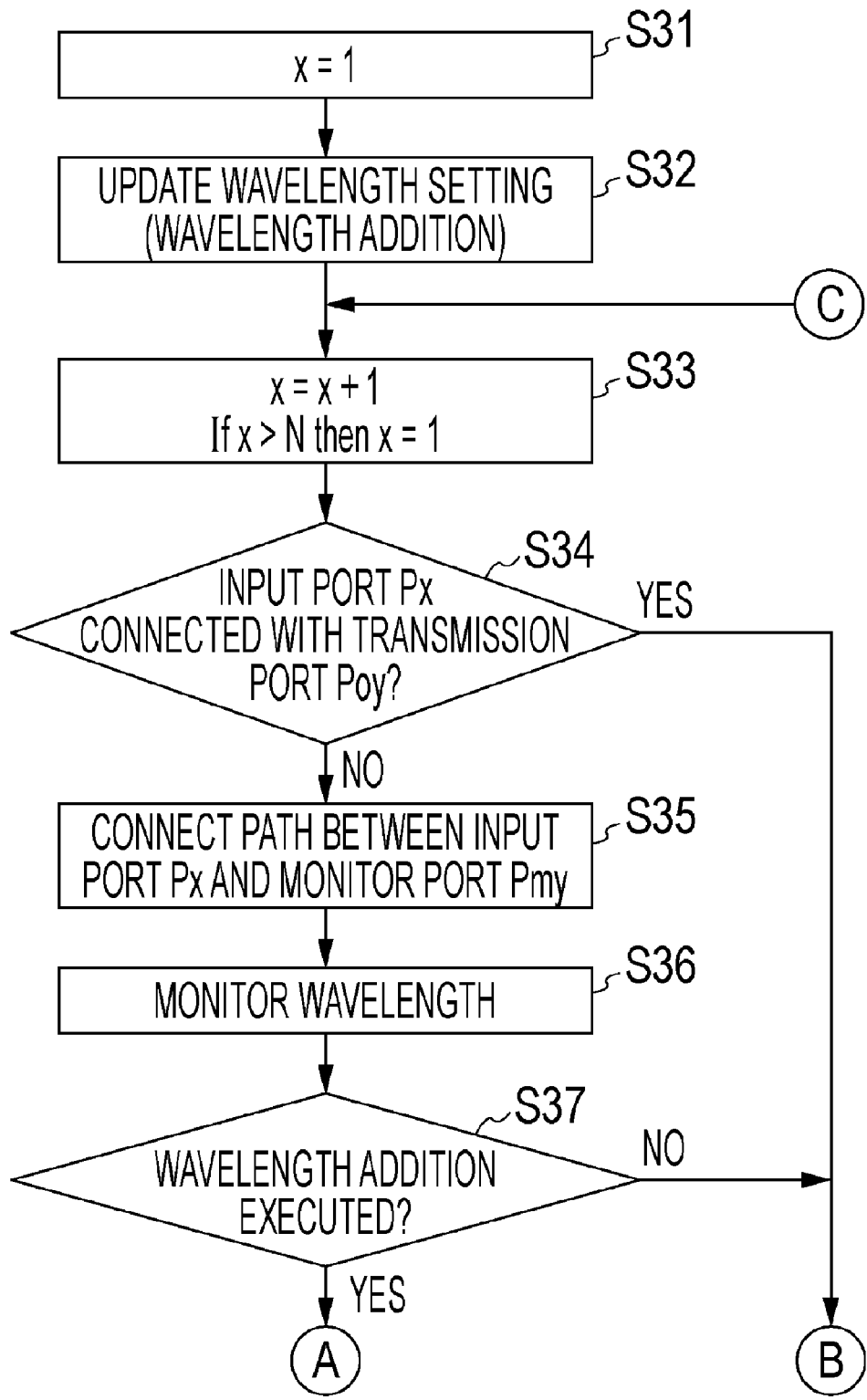
FIG. 8 is one part of a flowchart illustrating operations executed when wavelength setting is updated.
Figure 9:
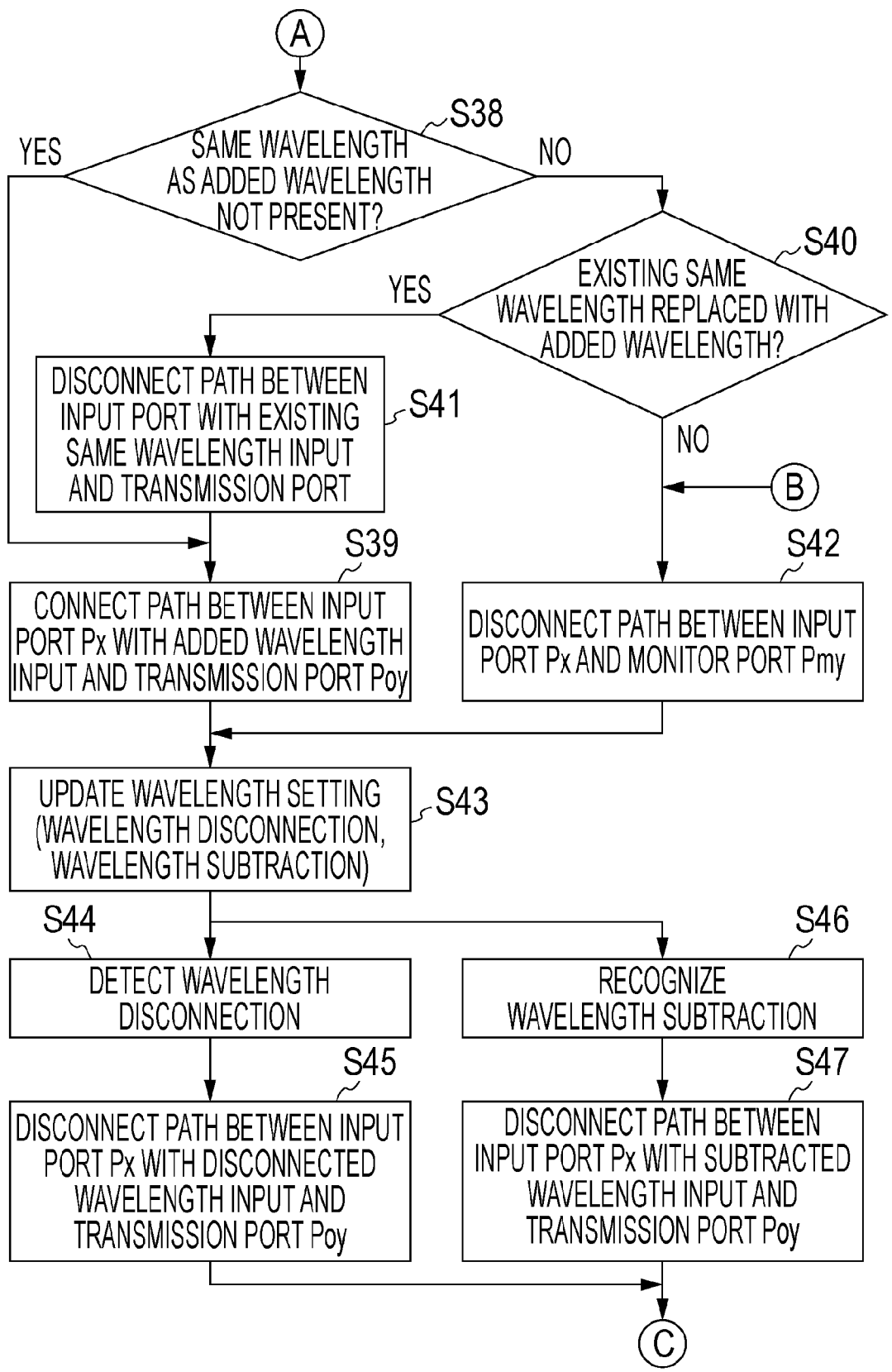
FIG. 9 is another part of the flowchart illustrating operations executed when wavelength setting is updated.

Next, operations of the WDM system executed when wavelength setting is updated will be described with reference to a flowchart concerned. FIGS. 8 and 9 are parts of a flowchart illustrating operations executed when wavelength setting is updated.

step S31: The respective input ports P1 to P8 and P9 to P16 of the WSSs 21-1 and 21-2 are generally inscribed as Px (x=1 to 16) and x=1.

step S32: The controller 24a recognizes to perform a wavelength setting updating process relating to wavelength addition.

step S33: x=x+1. However, when x>N, x=1. N is the largest port number. Thus, in the example illustrated in the drawing, N=16 and when x>16, x=1.

step S34: Whether a path of a light traveling from the input port Px toward the transmission port Poy is connected between the input port Px and the transmission port Poy (when x=1 to 8, y=1, when x=9 to 16, y=2) is determined. In the case that a path for any light of any wavelength is not connected between the input port Px and the transmission port Poy, the process proceeds to step S35. While, in the case that a path for a light of any one of the wavelengths is connected between these ports, the process proceeds to step S42.

step S35: The controller 24a connects the input port Px of the WSS concerned to the monitor port Pmy (when x=1 to 8, y=1 and when x=9 to 16, y=2). Specifically, switching will be performed so as to direct an input light toward the monitor port Pmy irrespective of inputting of a light of any wavelength in lights of wavelengths addition of which is possible through the input port Px. Therefore, the mesh switches 11c (FIG. 2) corresponding to all the wavelengths in the WSS concerned are equally switched to the monitor port Pmy.

step S36: the OMC 23 monitors the light output from the monitor port Pmy and the wavelength-combined signal which has been branched using the coupler Cp.

step S37: The controller 24a determines whether wavelength addition has been performed. In the case that the wavelength addition has been performed, the process proceeds to step S38. While, in the case that the wavelength addition is not performed, the process proceeds to step S42.

step S38: The OCM 23 determines whether a light of the same wavelength as that of a light which has been input into the WSS concerned through the input port Px is multiplexed to the wavelength-combined signal, that is, whether a light of the same wavelength as the added wavelength is not present. In the case that it has been determined that the light of the same wavelength as the added wavelength is not present, the process proceeds to step S39. While, in the case that it has been determined that the light of the same wavelength is present, the process proceeds to step S40.

step S39: The controller 24a gives the WSS concerned a switch command to output the light of the wavelength input into the input port Px from the transmission port Poy. The WSS connects a path which is established between the input port Px and the transmission port Poy and along which the light of the added wavelength travels from the input port Px toward the transmission port Poy on the basis of the switch command. In addition, in the above mentioned case, the attenuation amount of the light is stepwise decreased to adjust the light level so as to output the light of the added wavelength at a desired level. Further, light paths of wavelengths other than the added wavelength at the input port Px are still being connected to the monitor port Pmy and hence connection of these light paths is cut off.

step S40: Whether the light of the existing same wavelength as the added wavelength is to be replaced with the light of the added wavelength is determined. In the case that wavelength replacement has been determined to be performed, the process proceeds to step S41. While in the case that the wavelength replacement has been determined not to be performed, the process proceeds to step S42.

step S41: The controller 24a gives the WSS concerned a switch command to disconnect the path of the light of the existing same wavelength as the added wavelength. For example, assuming that the light of the same wavelength as the added wavelength is input into the input port P9 of the WSS 21-2, the WSS 21-2 will disconnect the path which is established between the input port P9 and the transmission port Po1 and along which the light of the existing same wavelength as the added wavelength travels from the input port P9 toward the transmission port Po1. Incidentally, in the above mentioned case, disconnection is not performed instantly and disconnection is performed while adjusting the level of the light of the existing same wavelength as the added wavelength by stepwise increasing the attenuation amount thereof. The process then proceeds to step S39.

step S42: The controller 24a gives the WSS concerned a switch command to disconnect the path of the light which has been input into the input port Px of the WSS. The WSS disconnects paths which are established between the input port Px and the monitor port Pmy and along which lights of all the wavelengths travel from the input port Px toward the monitor port Pmy.

step S43: The controller 24a recognizes that wavelength disconnection or wavelength subtraction has been performed as a wavelength setting updating process.

step S44: The OCM 23 detects that the path of the light which has been input into the WSS concerned through the input port Px in signal lights of the multiplexed wavelengths in the wavelength-combined signal has been disconnected. The OCM 23 notifies the controller 24a of detection of wavelength disconnection.

step S45: The controller 24a gives the WSS concerned a switch command to cut off the connection between the input port Px into which the light of the disconnected wavelength has been input and the transmission port Poy. For example, assuming that the path of the light which has been input into the WSS 21-1 through the input port P2 has been disconnected, the WSS 21-1 will disconnect paths which are established between the input port P2 and the transmission port Po1 and along which lights of all the wavelengths travel from the input port P2 toward the transmission port Po1. The process then returns to step S33.

step S46: The controller 24a recognizes that wavelength subtraction has been set for the light of the wavelength which has been input into the WSS concerned through the input port Px in the signal lights of the multiplexed wavelengths in the wavelength-combined signal.

step S47: The controller 24a gives the WSS concerned a switch command to cut off the connection between the input port Px into which the light of the wavelength subtraction of which has been set has been input and the transmission port Poy. For example, assuming that the wavelength of the light which has been input into the WSS 21-1 through the input port P2 is to be subtracted, the WSS 21-1 will disconnect a path which is established between the input port P2 and the transmission port Po1 and along which the light of a wavelength to be subtracted (hereinafter, referred to as the subtracted wavelength) travels from the input port P2 toward the transmission port Po1. Incidentally, in the above mentioned case, disconnection is performed while adjusting the level of the light of the subtracted wavelength by stepwise increasing the attenuation amount thereof. The process then returns to step S33.

Third Embodiment

Next, an altered example of the WDM system will be described. In the above mentioned WDM systems 1 and 1-1, one port which has been originally the input port of the WSS is used as the monitor port. On the other hand, in the altered example, a new switch device is installed to add a monitor port thereto without installing the monitor port in the WSS.

Figure 10:
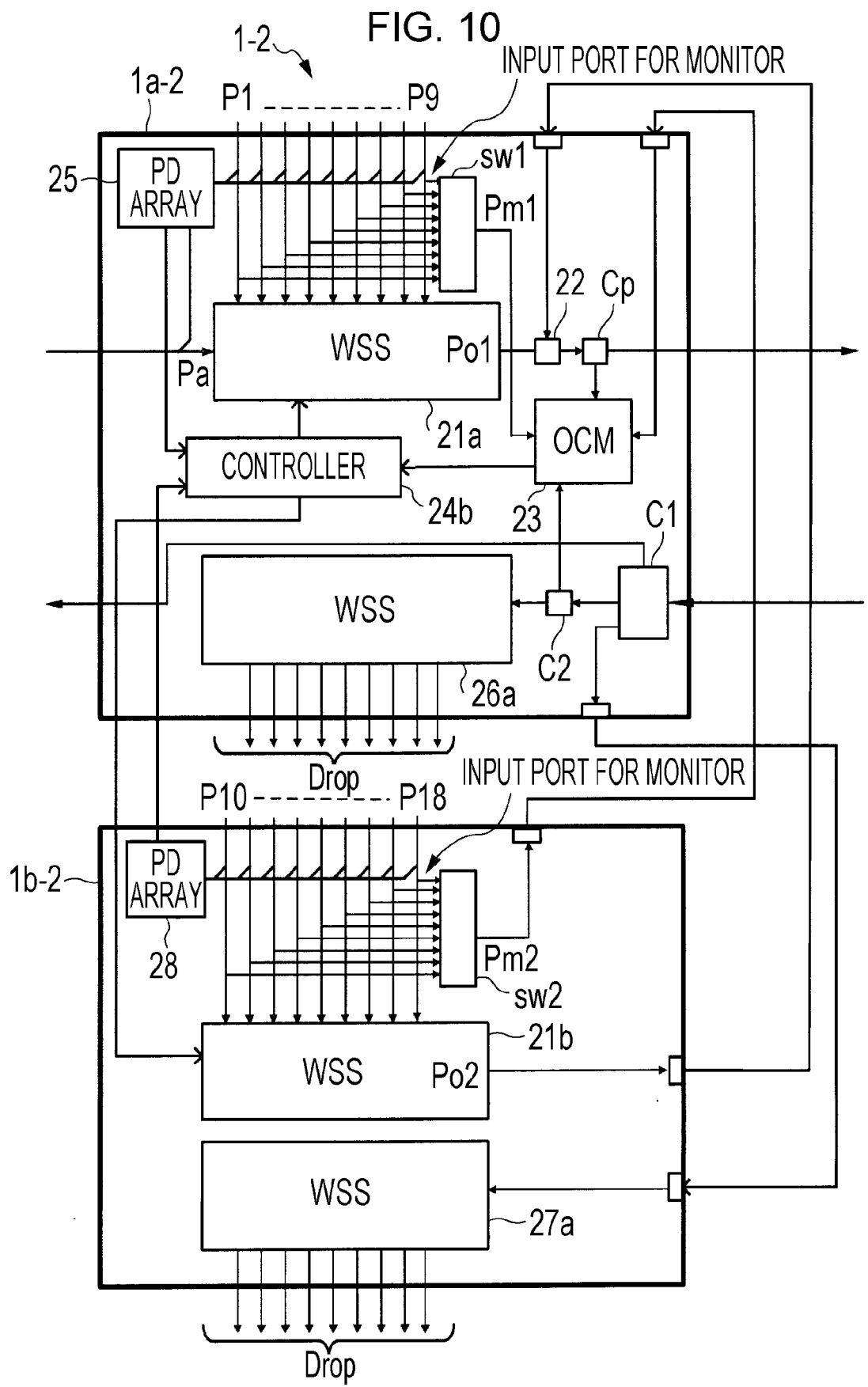
FIG. 10 is a diagram illustrating an example of a configuration of a further WDM system.

FIG. 10 is a diagram illustrating an example of a configuration of a WDM system. A WDM system 1-2 includes a master node 1a-2 and a slave node 1b-2. The master node 1a-2 has a WSS 21a, the multiplexer 22, the OCM 23, a controller 24b, the PD array 25, a WSS 26a, the couplers Cp, C1 and C2 and a monitor switch sw1. The slave node 1b-2 has a WSS 21b, a WSS 27a, the PD array 28 and a monitor switch sw2.

The monitor switch sw1 has nine input ports and one output port. Nine input ports serve as input ports for monitor and are respectively connected to the input ports P1 to P9. The output port of the monitor switch sw1 serves as a monitor port Pm1 and is connected to the OCM 23.

In the case that a light has been input into any one of the input ports P1 to P9, the monitor switch sw1 receives the light via one input port for monitor and switches the light to be output from the monitor port Pm1.

Likewise, the monitor switch sw2 has nine input ports and one output port. Nine input ports serve as input ports for monitor and are respectively connected to the input ports P10 to P18. The output port of the monitor switch sw2 serves as a monitor port Pm2 and is connected to the OCM 23.

In the case that a light has been input into any one of the input ports P10 to P18, the monitor switch sw2 receives the light via one input port for monitor and switches the light to be output from the monitor port Pm2.

Incidentally, both the monitor switches sw1 and sw2 control switching (a switch control line is not illustrated) on the basis of switch commands from the controller 24b. Other functions and operations of the system according to this embodiment are basically the same as those which have been described with reference to FIG. 3 and description thereof will be omitted. The control which has been described with reference to FIG. 3 may be also realized by additionally providing the monitor switches sw1 and sw2 in the above mentioned manner.

Fourth Embodiment

Figure 11:
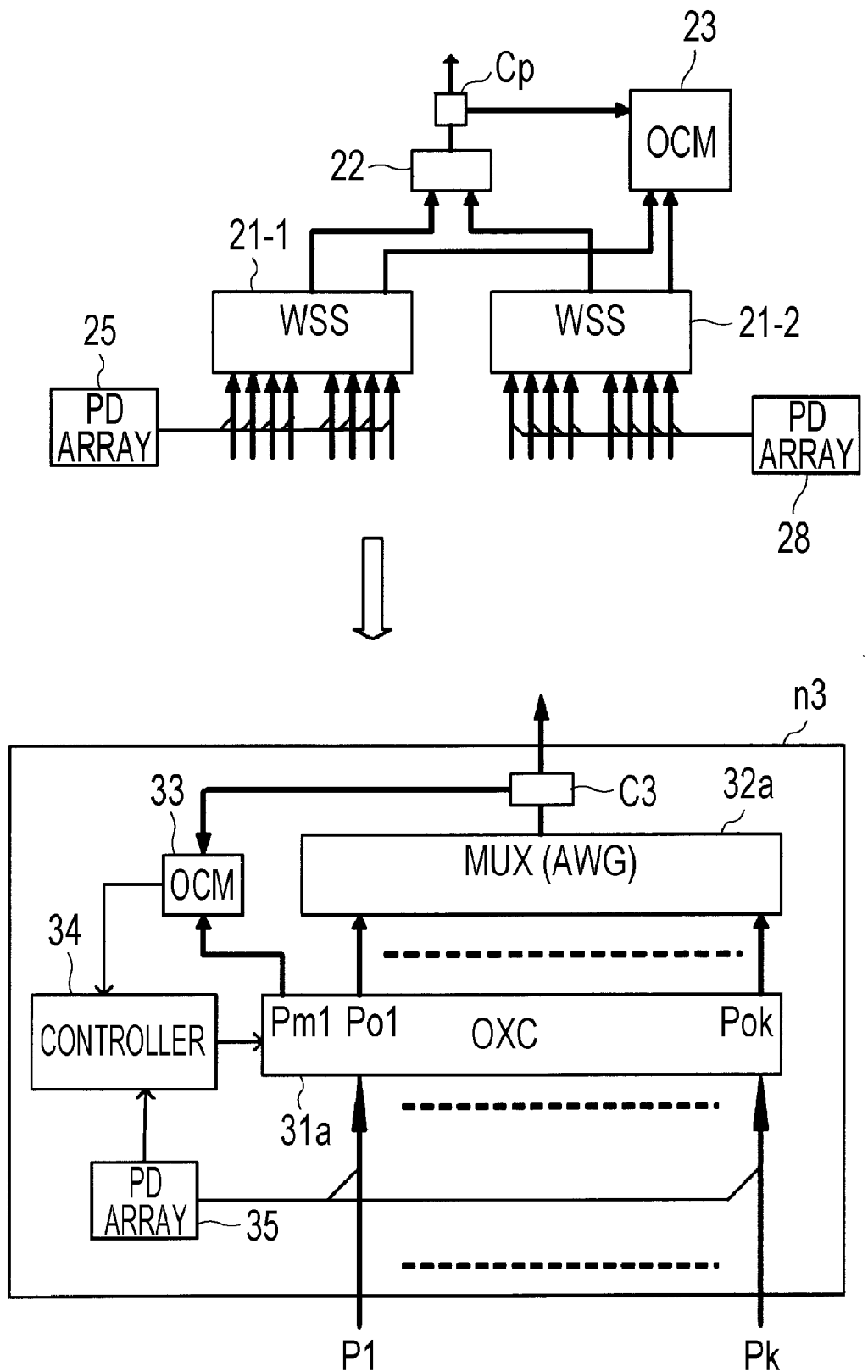
FIG. 11 is a diagram illustrating an example of one configuration for performing WDM transmission using an OXC (optical cross connect)

Next, examples in which an OXC (Optical Cross-Connect) is used in place of the WSS will be described. FIGS. 11 and 12 are diagrams illustrating examples of configurations for performing WDM transmission by using OXCs. FIG. 11 illustrates wavelength multiplexing using the OXC and FIG. 12 illustrates wavelength demultiplexing using the OXC. Incidentally, in order to clarify a difference in wavelength multiplexing and demultiplexing between the system using the WSSs and the system using the OXCs, the configurations of these WSSs are also illustrated in the drawings.

A node n3 illustrated in FIG. 11 includes an OXC 31a, a MUX 32a, an OCM 33, a controller 34, a PD array 35 and a coupler C3. The OXC 31a switches lights input into the input ports P1 to Pk to be output from the transmission ports Po1 to Pok so as to be transmitted to the MUX 32a. The MUX 32a multiplexes the lights output from the transmission ports Po1 to Pok of the OXC 31a to generate and output a wavelength-combined signal (a wavelength-multiplexed signal).

The coupler C3 divides the wavelength-combined signal output from the MUX 32a into two branch signals. The OCM 33 monitors the light output from the monitor port Pm1 of the OXC 31a and the light multiplexed with the wavelength-combined signal. The PD array 35 is connected to the respective input ports P1 to Pk of the OXC 31a and, when it detects a light input into any one of the input ports, transmits a detection signal indicative of detection of the input light to the controller 34.

The node n3 illustrated in FIG. 12 includes a DMUX 32b and an OXC 31b. The DMUX 32b demultiplexes the wavelength of the received wavelength-combined signal and then outputs a light of the demultiplexed wavelength. The OXC 31b switches the light of the wavelength obtained after demultiplexing to drop it out of a predetermined port (although, in the above mentioned examples, the nodes n3 and n3a have been described as separate nodes in order to clarify the configurations for multiplexing and demultiplexing, the multiplexing and demultiplexing functions are included on one node in reality).

Figure 13:
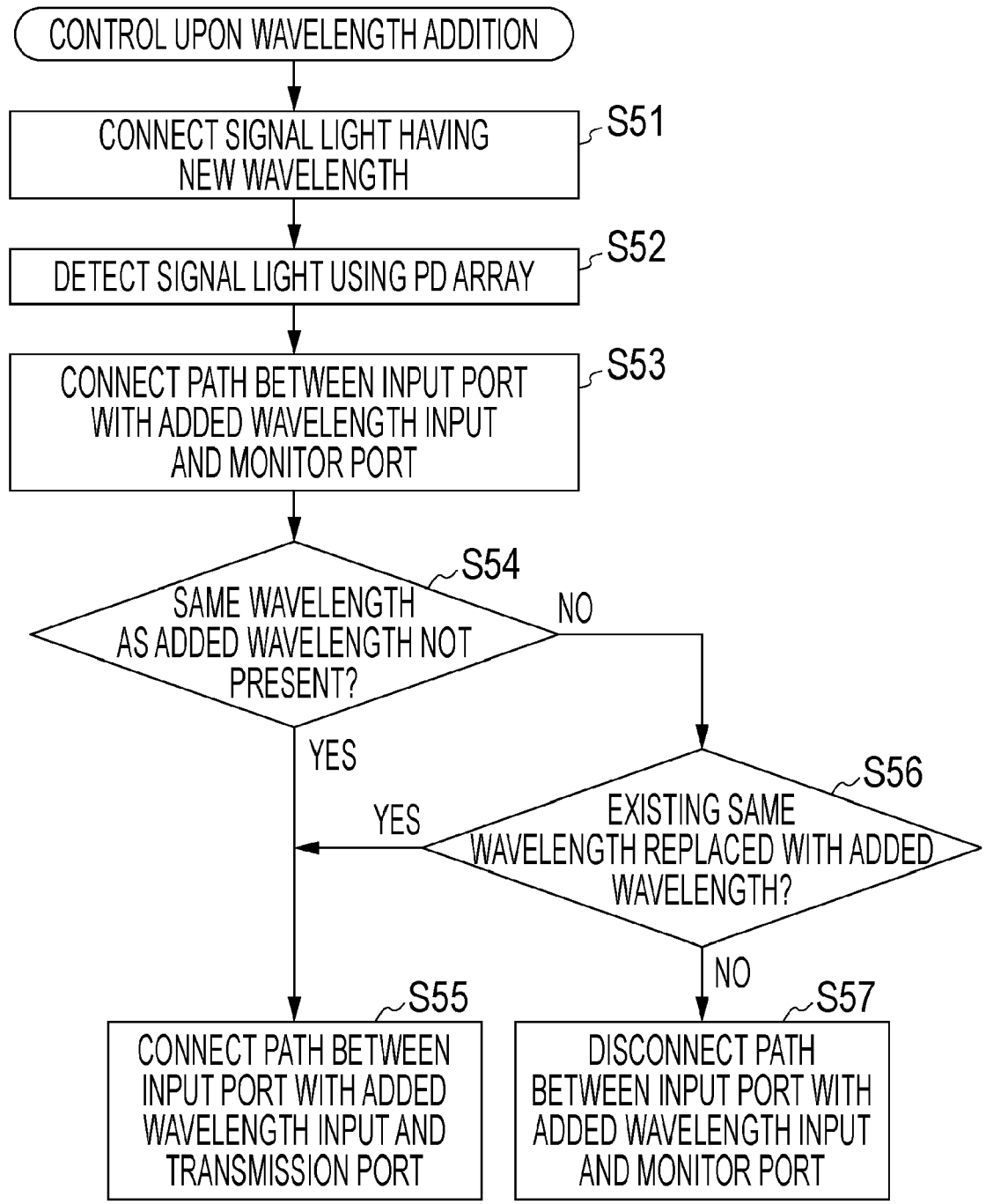
FIG. 13 is a flowchart illustrating operations executed when a wavelength has been added.

Next, operations executed when a wavelength has been added in a WDM system using an OXC will be described with reference to a flowchart. FIG. 13 is a flowchart illustrating the operations executed when a wavelength has been added.

step S51: A new signal light is input into the input port P1 for the purpose of wavelength addition (by way of example, it is assumed that wavelength addition has been performed at the input port P1).

step S52: The PD array detects the signal light input into the input port P1 and transmits a detection signal to the controller 34.

step S53: The controller 34 gives the OXC 31a a switch command to connect the input port P1 to the monitor port Pm1 and the OXC 31a performs switching on the basis of the switch command.

step S54: The OCM 33 monitors the light output from the monitor port Pm1 of the OXC 31a and the wavelength-combined signal output from the MUX 32a. In the example illustrated in the drawing, whether a light of the same wavelength as that of the light which has been input into the OXC 31a through the input port P1 is multiplexed to the wavelength-combined signal (that is, whether a light of the same wavelength as the added wavelength is not present) is determined. In the case that it has been determined that the light of the same wavelength as the added wavelength is not present, the process proceeds to step S55. While, in the case that it has been determined that the light of the same wavelength as the added wavelength is present, the process proceeds to step S56.

step S55: The controller 34 gives the OXC 31a a switch command to output the light input into the input port P1 from a predetermined transmission port. The OXC 31a outputs the light of the added wavelength from the predetermined transmission port on the basis of the switch command.

step S56: Whether the light of the existing same wavelength as the added wavelength is to be replaced with the light of the added wavelength is determined. In the case that wavelength replacement is to be performed, the process proceeds to step S55. While, in the case that wavelength replacement is not performed, the process proceeds to step S57.

step S57: The controller 34 gives the OXC 31a a switch command to disconnect the light which has been input into the input port P1 of the OXC 31a. The OXC 31a controls so as not to output the light input into the OXC 31a through its input port P1 from any of its transmission ports (which will be described later with reference to FIG. 17). Incidentally, the OXC 31a controls so as not to output a light which is input into the OXC 31a through its input port concerned from any of its transmission ports also in the case that wavelength disconnection has occurred or wavelength subtraction has been performed.

The WDM transmission may be also realized using the OXCs in place of the WSSs as described above. In the case that the WDM transmission is to be performed using the WSSs, the number of the WSSs used is increased with increasing the number of wavelengths. Therefore, in the case that a large number of wavelengths are to be handled, downsizing of the apparatus may be realized by configuring a wavelength multiplexing section by combining the AWG with the OXC in the above mentioned manner.

Incidentally, in the case that the OXC is used, lights of the same wavelength may be input into a single OXC. Even in the case that lights of the same wavelength are input into the group of input ports of the OXC concerned, the lights of the same wavelength may be prevented from colliding with each other when the wavelengths are to be multiplexed by performing appropriate switch control using the controller 34.

Fifth Embodiment

Figure 14:
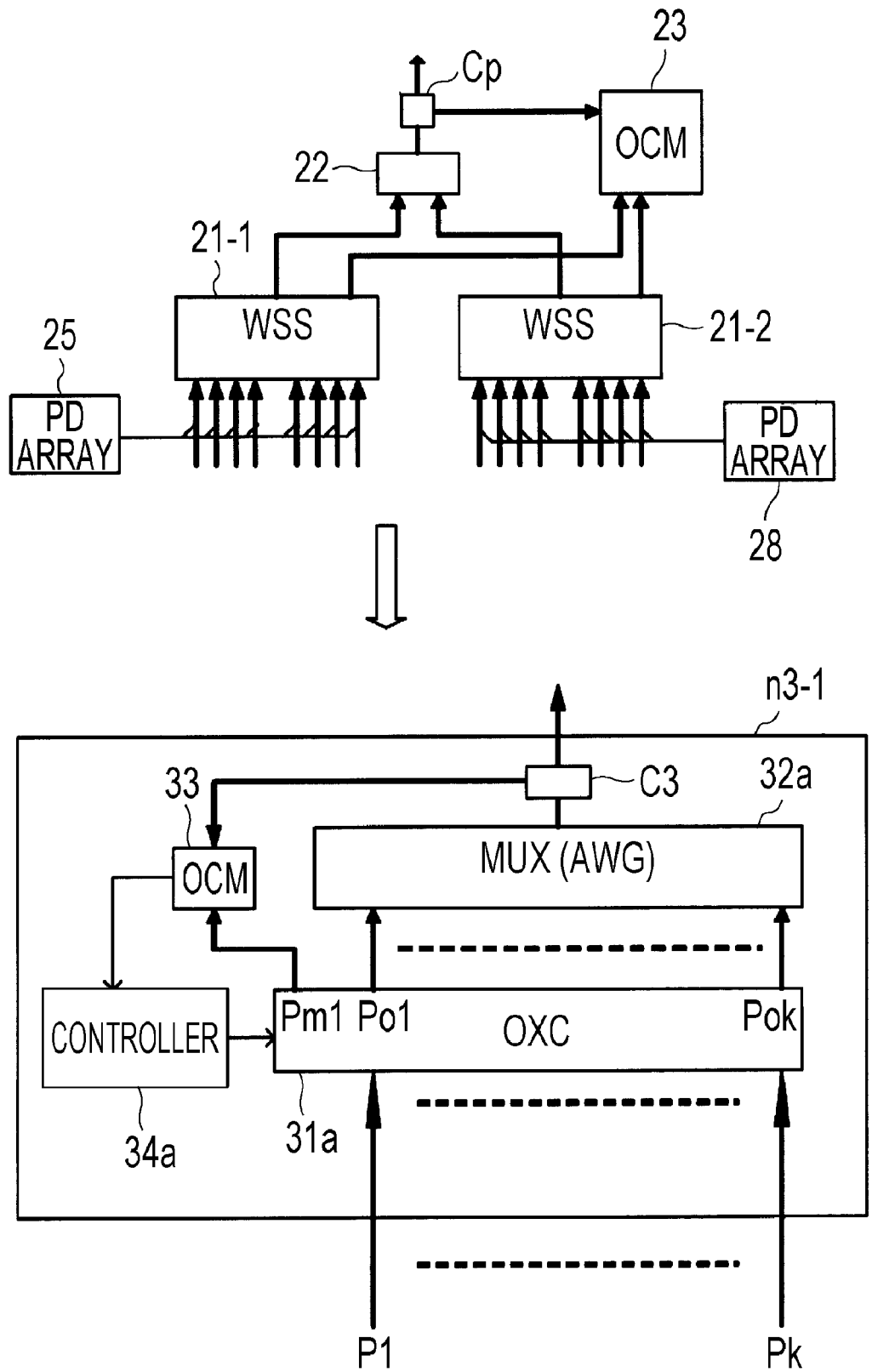
FIG. 14 is a diagram illustrating an example of a further configuration for performing WDM transmission using an OXC.

Next, an example in which a PD array is not used will be described. FIG. 14 is a diagram illustrating an example of a configuration for performing WDM transmission using an OXC. Incidentally, the configuration for wavelength demultiplexing is the same as that illustrated in FIG. 12, so that only a configuration for wavelength multiplexing is illustrated in the drawing. In FIG. 14, a node n3-1 includes the OXC 31a, the MUX 32a, the OCM 33, a controller 34a and the coupler C3. The controller 34a detects to see whether wavelength addition is made at the input ports P1 to Pk at a fixed cycle and in the case that wavelength addition is made, performs switch control relating to wavelength addition.

Figure 15:
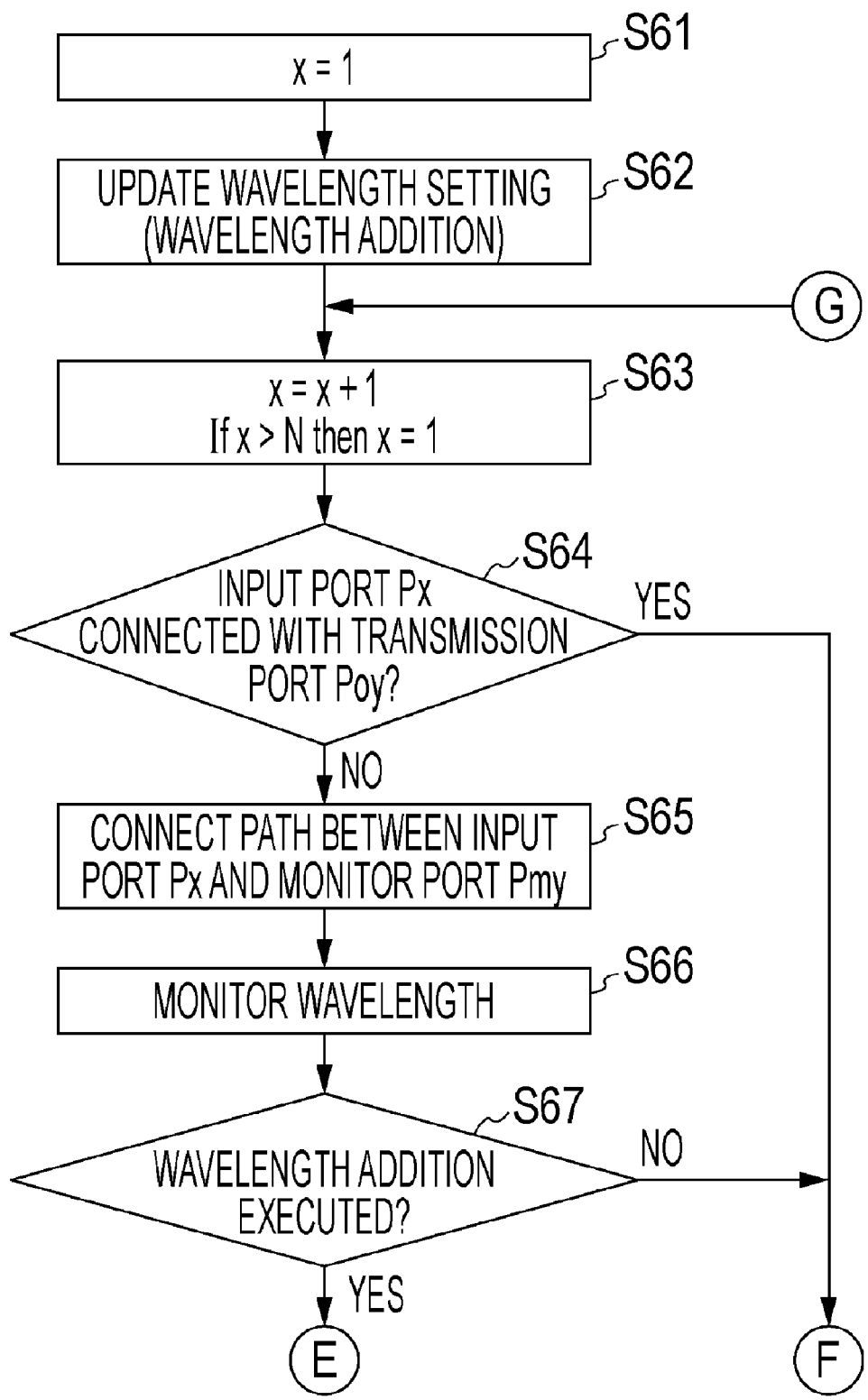
FIG. 15 is one part of a flowchart illustrating operations executed when wavelength setting is updated.
Figure 16:
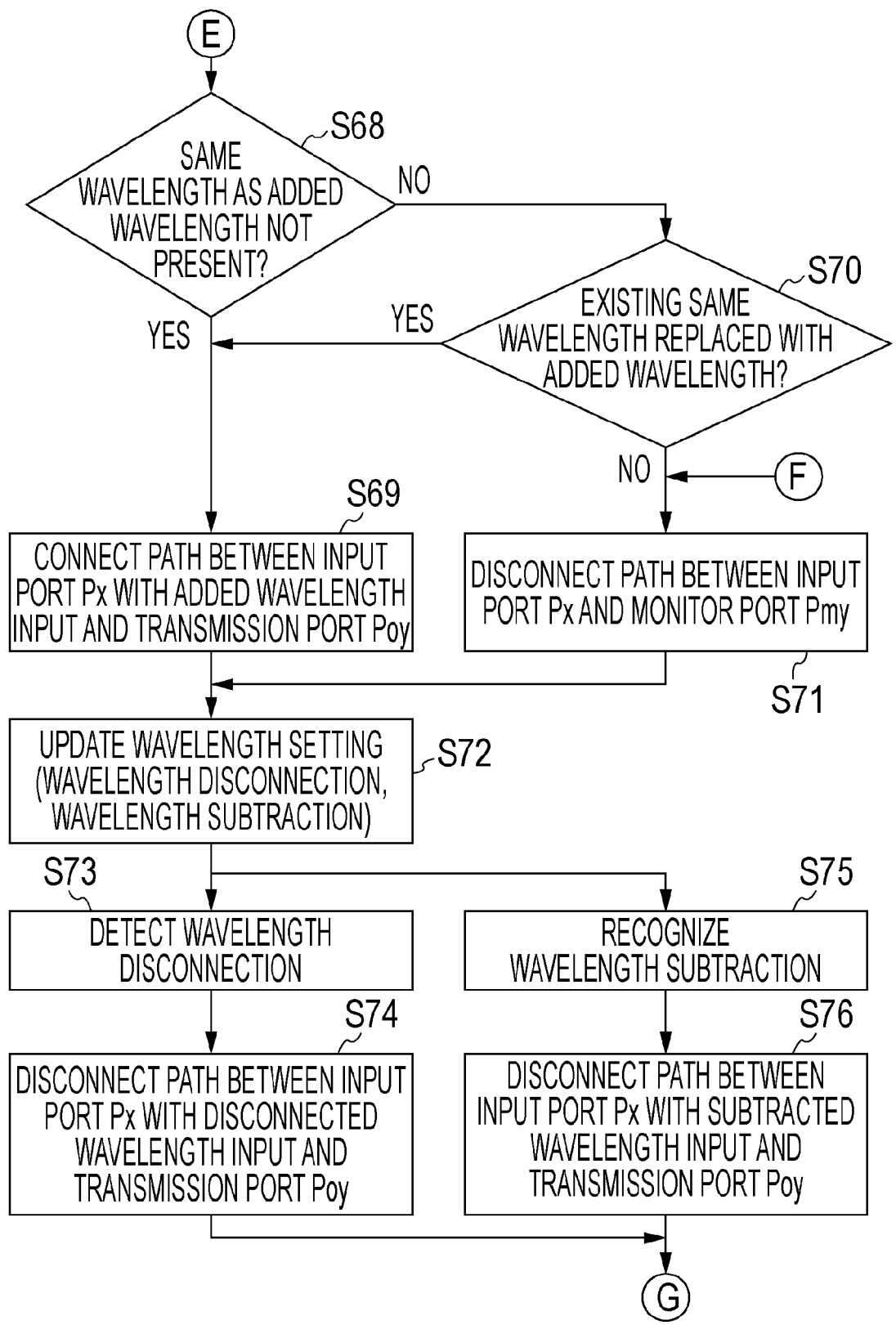
FIG. 16 is another part of the flowchart illustrating operations executed when wavelength setting is updated.

Next, operations executed when wavelength setting is updated will be described with reference to a flowchart. FIGS. 15 and 16 are parts of a flowchart illustrating the operations executed when the wavelength setting is updated.

step S61: The input ports of the OXC 31a are generally inscribed as an input port Px and x is set to one, that is, x=1 ($1 \leq x \leq k$).

step S62: The controller 34a recognizes to perform a wavelength setting updating process relating to wavelength addition.

step S63: x=x+1. Incidentally, when x>N, x=1. N is the largest port number (in the example illustrated in the drawing, N=k).

step S64: Whether a light path directing from the input port Px toward the transmission port Poy is connected between the input port Px and the transmission port Poy ($1 \leq y \leq k$) is determined. In the case that the light path is not established between the input port Px and the transmission port Poy, the process proceeds to step S65. While, in the case that the light path is established between these ports, the process proceeds to step S71.

step S65: The controller 34a connects the input port Px of the OXC to the monitor port Pmy.

step S66: The OCM 33 monitors a light output from the monitor port Pmy and a wavelength-combined signal output from the MUX 32a.

step S67: The controller 34a determines whether wavelength addition has been performed. In the case that wavelength addition has been performed, the process proceeds to step S68. While, in the case that wavelength addition is not performed, the process proceeds to step S71.

step S68: The OCM 33 determines whether a light of the same wavelength as that of the light input into the OXC 3a through the input port Px is multiplexed to the wavelength-combined signal (that is, whether the light of the same wavelength as the added wavelength is not present). In the case that it has been determined that the light of the same wavelength as the added wavelength is not present, the process proceeds to step S69. While, in the case that it has been determined that the light of the same wavelength is present, the process proceeds to step S70.

step S69: The controller 34a gives the OXC 31a a switch command to output the light which has been input into the input port Px from the predetermined transmission port Poy. The OXC 31a connects a path which is established between the input port Px and the transmission port Poy and along which the light of the added wavelength travels from the input port Px toward the transmission port Poy.

step S70: Whether the light of the same existing wavelength as the added wavelength is to be replaced with the light of the added wavelength is determined. In the case that wavelength replacement is to be performed, the process proceeds to step S69. While, in the case that the wavelength replacement is not performed, the process proceeds to step S71.

step S71: The controller 34a gives the OXC 31a a switch command to disconnect the path of the light input into the input port Px. The OXC 31a disconnects the path along which the light travels from the input port Px toward the monitor port Pmy on the basis of the switch command.

step S72: The controller 34a recognizes that wavelength disconnection or wavelength subtraction has been performed as a wavelength setting updating process.

step S73: The OCM 33 detects disconnection of the light which has been input into the OXC 31a through the input port Px in the lights of the multiplexed wavelengths of the wavelength-combined signal and notifies the controller 34a of detection of the wavelength disconnection.

step S74: The controller 34a gives the OXC 31a a switch command to cut off the connection between the input port Px into which the light of the disconnected wavelength has been input and the transmission port Poy. The process then returns to step S63.

step S75: The controller 34a recognizes that wavelength subtraction has been set for the light which has been input through the input port Px in the lights of the multiplexed wavelengths of the wavelength-combined signal.

step S76: The controller 34a gives the OXC 3a a switch command to cut off the connection between the input port Px into which the light of the wavelength subtraction of which has been set has been input and the transmission port Poy. The process then returns to step S63.

Figure 17:
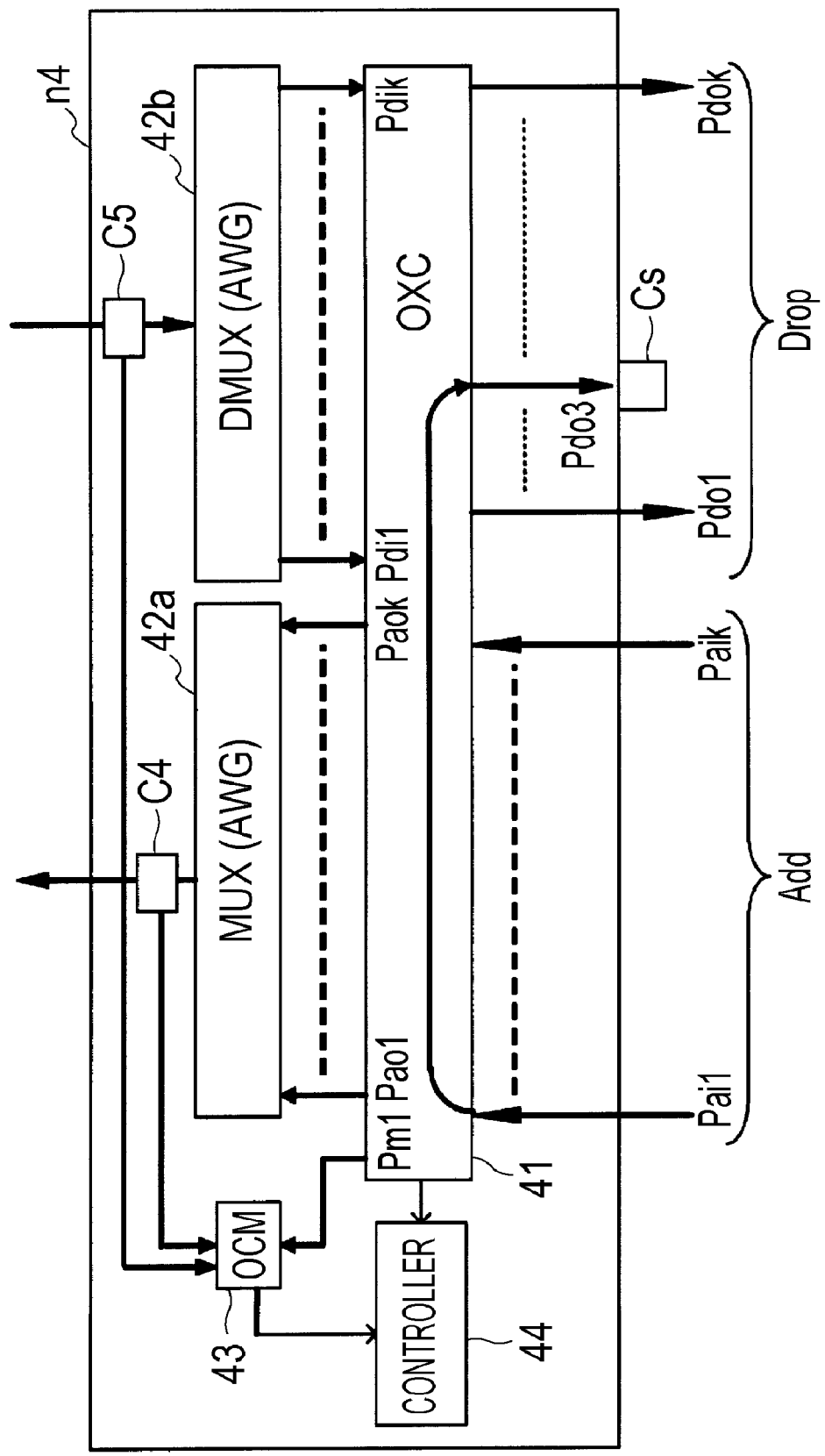
FIG. 17 is a diagram illustrating a manner of blocking a disconnected wavelength using an OXC.

Next, blocking to be performed using an OXC upon execution of a wavelength cutting (eliminating) process by disconnecting or subtracting a wavelength will be described. FIG. 17 is a diagram illustrating a manner of blocking a cut wavelength using the OXC. A node n4 includes an OXC 41, a MUX 4a, a DMUX 42b, an OMC 43, a controller 44 and couplers C4 and C5.

The OXC 41 performs switching on lights of wavelengths which have been input into (added to) input ports Pai1 to Paik on an Add side to be output from predetermined transmission ports Pao1 to Paok on the Add side so as to be transmitted to the MUX 42a. In addition, the OXC 41 receives lights output from the DMUX 42b at input ports Pdi1 to Pdik on a Drop side and drops the lights out of predetermined transmission ports Pdo1 to Pdok on the Drop side.

The MUX 42a multiplexes the lights output from the transmission ports Pao1 to Paok on the Add side of the OXC 41 to generate and output a wavelength-combined signal (wavelength-multiplexed) signal. The DMUX 42b receives the wavelength-combined signal and demultiplexes the wavelength of the signal to be output to input ports Pdi1 to Pdik on the Drop side of the OXC 41.

The coupler C4 divides the wavelength-combined signal output from the MUX 42a into two branch signals and transmits one branch signal to the outside and another branch signal to the OCM 43. The coupler C5 divides the received wavelength-combined signal into two branch signals and transmits one branch signal to the DMUX 42b and another branch signal to the OCM 43.

The OCM 43 monitors the wavelength of the light output from the monitor port Pm1 of the OXC 41 and the wavelength of the light multiplexed with the wavelength-combined signal. The controller 44 detects to see whether wavelength addition is performed at the input ports Pai1 to Paik at a fixed cycle and performs switch control relating to wavelength addition when the wavelength addition has been performed at any one of the input ports.

In the above mentioned situation, it is assumed that the light input into the OXC 41 through the input port Pai1 is to be blocked. The controller 44 gives the OXC 41 a command to block the wavelength of the light input through the input port Pai1. The OXC 41 receives the command for wavelength blocking, connects by return the input port Pai1 to a free transmission port (for example, a transmission port Pdo3) on the Drop side so as to output all the lights input through the input port Pai1 from the transmission port Pdo3 on the Drop side. Incidentally, a connector Cs with a shutter is attached to the free transmission port Pdo3 on the Drop side to decrease light emission to the outside through a port end of the transmission port Pdo3 on the Drop side, thereby ensuring safety.

As described above, in the case that it has been recognized that the light of the same wavelength as the added (Add) wavelength is present in the multiplexed wavelengths, the controller 44 gives the OXC 41a switch command to block the light of the wavelength to be cut off. The OXC 41 connects by return the input port into which the light of the wavelength to be cut off is input to an unused output port on the basis of the switch command. Owing to the above mentioned operations, it may become possible to prevent lights of the same wavelength from colliding with each other.

According to the above mentioned embodiments, it may become possible to provide an optical transmission apparatus configured to prevent communication failures from generating owing to occurrence of collision of lights of the same wavelength.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An optical transmission apparatus comprising:
   a plurality of wavelength selective switches, each including input ports, a transmission port used to output a wavelength multiplexed light containing input light from the input ports that is switched and multiplexed, and a monitor port used to output a monitored light switched from one of the input ports, so that the input light is monitored;
   a multiplexer to combine wavelength multiplexed lights output from the transmission ports of the plurality of wavelength selective switches;
   a monitor to monitor whether a same wavelength of the monitored light output from the monitor port exists in wavelengths of the wavelength multiplexed lights combined by the multiplexer; and
   a controller to control each of the wavelength selective switches so as to output, from the transmission port, the monitored light switched to the monitor port only when the same wavelength of the monitored light is absent from the wavelengths of the wavelength multiplexed lights combined by the multiplexer prior to receipt of the monitored light, based on a monitor result output by the monitor, and when the monitored light replaces a same wavelength light input to another of the wavelength selective switches.

2. The optical transmission apparatus according to claim 1, further comprising:
   a light detection unit to output a detection signal used to indicate a detection of a light input to the input port;
   wherein the controller controls each of the wavelength selective switches so as to output the light input to the input port from the monitor port in case that the controller receives the detection signal.

3. The optical transmission apparatus according to claim 1, wherein the controller controls each of the wavelength selective switches so that the input port is connected to the monitor port at a constant cycle, the input port being unused for a wavelength addition.

4. An optical transmission apparatus comprising:
   a plurality of wavelength selective switches, each including input ports, a transmission port used to output a wavelength multiplexed light containing input light from the input ports that is switched and multiplexed, and a monitor port used to output a monitored light switched from one of the input ports, so that the input light is monitored;
   a multiplexer to combine wavelength multiplexed lights output from the transmission ports of the plurality of wavelength selective switches;
   a monitor to monitor whether a same wavelength of the monitored light output from the monitor port exists in wavelengths of the wavelength multiplexed lights combined by the multiplexer; and a controller to control each of the wavelength selective switches so as to disconnect a first path which is established between a first input port and the transmission port, when currently transmitted light having the same wavelength as newly added light is being transmitted on the first path, in a case where the currently transmitted light being combined by the multiplexer is replaced with the newly added light to disconnect a second path which is established between a second input port and the monitor port, in a case where the currently transmitted light combined by the multiplexer is not replaced with the newly added light.

5. The optical transmission apparatus according to claim 1, wherein, in case that the monitor detects disconnection of the light of a wavelength in the light combined by the multiplexer, the controller controls the wavelength selective switch so as to disconnect a path which is established between the input port where the light of the disconnected wavelength was input and the transmission port, and in case that the controller determines subtraction has been set for a wavelength of a light in lights combined by the multiplexer, the controller controls the wavelength selective switch so as to disconnect a path which is established between the input port input where the light of the subtracted wavelength was input and the transmission port.

6. The optical transmission apparatus according to claim 1, wherein, in case that a path from the input port to the transmission port is established, the wavelength selective switch stepwise decreases an attenuation amount of the light, and in case that the path from the input port to the transmission port is disconnected, the wavelength selective switch stepwise increases the attenuation amount of the light.

7. An optical transmission apparatus comprising:

a controller;

a plurality of wavelength selective switches, each including input ports, and a transmission port used to output a wavelength multiplexed light containing input light from the input ports that is switched and multiplexed;

a monitor switch including a plurality of input ports for monitor being respectively connected to the input ports, and a monitor port used to output a light switched so that the light from the input port is monitored, the monitor switch of each wavelength selective switch being arranged, the monitor switch outputting a light input from the input port and received via the input port for monitor from the monitor port based on control of the controller;

a multiplexer to combine wavelength multiplexed lights output from the transmission ports of the plurality of wavelength selective switches; and a monitor to monitor whether a same wavelength of the monitored light output from the monitor port exists in wavelengths of the wavelength multiplexed lights combined by the multiplexer;

wherein the controller controls each of the wavelength selective switches so as to output, from the transmission port, the monitored light switched to the monitor port only when the same wavelength of the monitored light is absent from the wavelengths of the wavelength multiplexed lights combined by the multiplexer prior to receipt of the monitored light and when the monitored light replaces a same wavelength light input to another of the wavelength selective switches.

8. An optical transmission apparatus comprising:

a controller;

an optical cross connect switch including input ports, a transmission port used to output a wavelength multiplexed light containing input light from the input ports that is switched and multiplexed, and a monitor port used to output a monitored light switched from one of the input ports, so that the input light is monitored, the optical cross connect switch outputting a light input from the input port from the monitor port based on control of the controller;

a multiplexer to combine wavelength multiplexed lights output from the transmission ports of the optical cross connect switch; and a monitor to monitor whether a same wavelength of the monitored light output from the monitor port exists in wavelengths of the wavelength multiplexed lights combined by the multiplexer;

wherein the controller controls the optical cross connect switch so as to output, from the transmission port, the light switched to the monitor port in case that the same wavelength of the light output from the monitor port is absent in wavelengths of the lights combined by the multiplexer, wherein, in case that the monitor detects disconnection of the light of a wavelength in the light combined by the multiplexer, the controller controls the optical cross connect switch so as to disconnect a path which is established between the input port where the light of the disconnected wavelength was input and the transmission port, and wherein, in case that the controller determines subtraction has been set for a wavelength of a light in lights combined by the multiplexer, the controller controls the optical cross connect switch so as to disconnect a path which is established between the input port input where the light of the subtracted wavelength was input and the transmission port.

9. The optical transmission apparatus according to claim 8, when the monitor determines that the same wavelength of the light output from the monitor port exists in wavelengths of the lights combined by the multiplexer, wherein the controller controls the optical cross connect switch so as to block a light of a wavelength disconnected, and the optical cross connect switch connects the input port in which the light of the wavelength disconnected is input with an output port unused.

10. The optical transmission apparatus according to claim 8, further comprising:

a light detection unit to output a detection signal used to indicate a detection of a light input to the input port;

wherein the controller controls the optical cross connect switch so as to output the light input to the input port from the monitor port in case that the controller receives the detection signal.

11. The optical transmission apparatus according to claim 8, wherein the controller controls the optical cross connect switch so that the input port is connected to the monitor port at a constant cycle, the input port being unused for a wavelength addition.

* * * * *

UNITED STATES PATENT AND TRADEMARK OFFICE
CERTIFICATE OF CORRECTION

PATENT NO. : 8,401,386 B2  
APPLICATION NO. : 12/749610  
DATED : March 19, 2013  
INVENTOR(S) : Futoshi Izumi Page 1 of 1

It is certified that error appears in the above-identified patent and that said Letters Patent is hereby corrected as shown below:

In the Claims

Column 19, Line 10, In Claim 4, delete "light" and insert -- light, and --, therefor.

Signed and Sealed this  
Eighteenth Day of March, 2014

Michelle K. Lee  
*Deputy Director of the United States Patent and Trademark Office*